United States Patent
Agarwal et al.

(10) Patent No.: US 10,534,433 B1
(45) Date of Patent: Jan. 14, 2020

(54) WEARABLE HAPTIC DEVICES WITH JAMMING ASSEMBLIES FOR HAPTIC JAMMING

(71) Applicant: Facebook Technologies, LLC, Menlo Park, CA (US)

(72) Inventors: Priyanshu Agarwal, Kirkland, WA (US); Nicholas Colonnese, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/112,517

(22) Filed: Aug. 24, 2018

(51) Int. Cl.
*G06F 3/01* (2006.01)
*G02B 27/01* (2006.01)

(52) U.S. Cl.
CPC .............. *G06F 3/014* (2013.01); *G06F 3/016* (2013.01); *G02B 27/017* (2013.01); *G06F 3/011* (2013.01)

(58) Field of Classification Search
CPC .......... G06F 3/014; G06F 3/016; G06F 3/011; G06F 3/017; G06F 2203/013; G02B 27/017; A63F 13/285; A63F 2300/1037; A63B 2071/0655
See application file for complete search history.

(56) References Cited

U.S. PATENT DOCUMENTS

| | | | | |
|---|---|---|---|---|
| 5,631,861 A | * | 5/1997 | Kramer | G06F 3/011 414/5 |
| 6,413,229 B1 | * | 7/2002 | Kramer | A61B 5/225 600/595 |
| 7,138,976 B1 | * | 11/2006 | Bouzit | G06F 3/014 345/156 |
| 7,495,654 B2 | * | 2/2009 | Khoshnevis | G06F 3/014 345/156 |
| 2016/0259417 A1 | * | 9/2016 | Gu | G06F 3/016 |
| 2016/0342207 A1 | * | 11/2016 | Beran | G06F 3/011 |
| 2017/0131769 A1 | * | 5/2017 | Keller | G06F 3/016 |
| 2017/0322626 A1 | * | 11/2017 | Hawkes | A63F 13/211 |
| 2017/0371416 A1 | * | 12/2017 | Zeitler | G06F 3/016 |
| 2018/0284896 A1 | * | 10/2018 | Kearney | G06F 3/011 |

* cited by examiner

*Primary Examiner* — Darlene M Ritchie
(74) *Attorney, Agent, or Firm* — Morgan, Lewis & Bockius LLP

(57) ABSTRACT

A haptic device is provided that includes a jamming assembly, anchored to the back of a user's hand, having (i) a jamming lever, (ii) an actuator to move the jamming lever from a first position to a second position different from the first position, and (iii) a slidable member configured to move back and forth in response to movement of a first of the user's fingers. The haptic device also includes an elongated element with opposing first and second end portions, where (i) the first end portion is anchored to a predefined portion of the user's first finger, and (ii) the second end portion is attached to an end portion of the slidable member. The jamming lever, when moved to the second position by the actuator, engages with a portion of the slidable member to prevent movement of the member, the elongated element, and the user's finger in a direction.

15 Claims, 14 Drawing Sheets

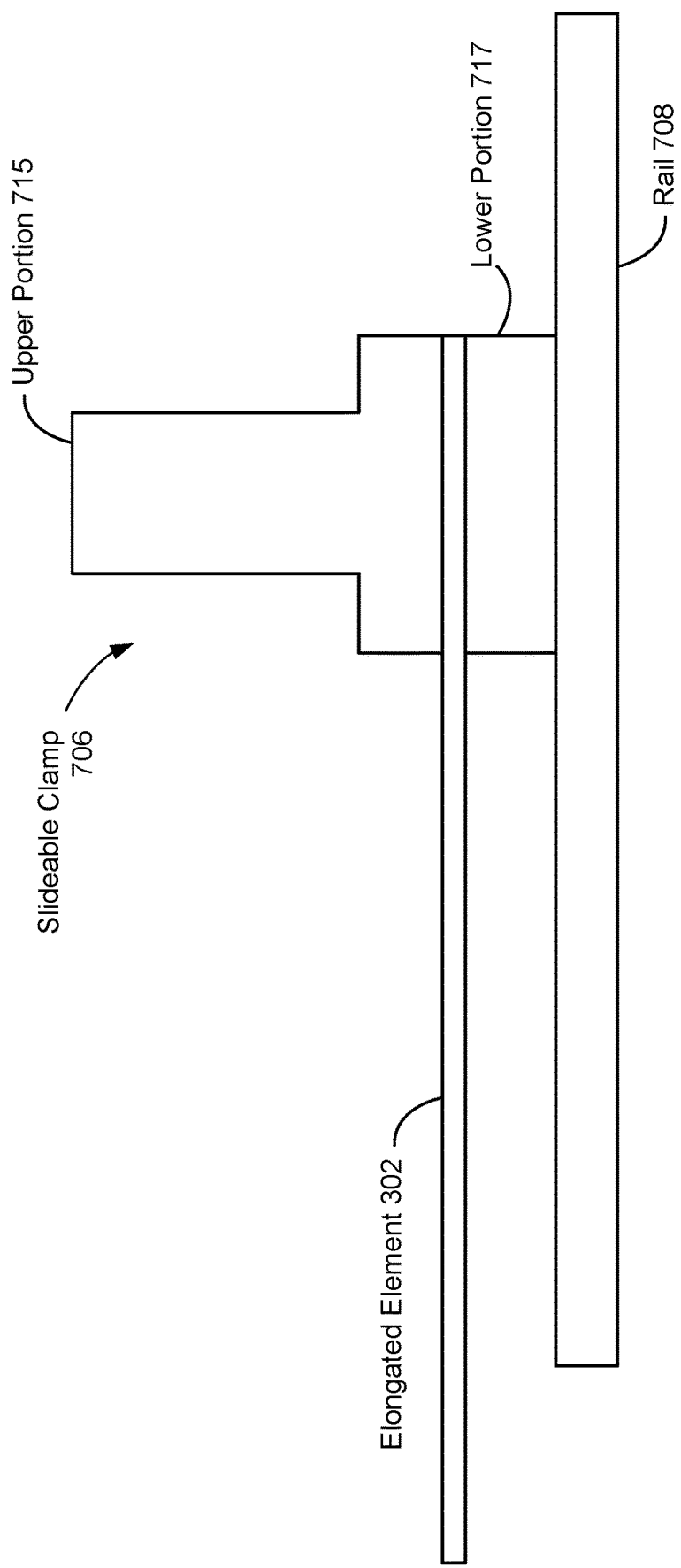

800

At a haptic device comprising (i) a jamming assembly anchored to the back of a user's hand and (ii) an elongated element anchored to a predefined portion of a first of the user's fingers 802

Receive an instruction from a computer system to transition an actuator of the jamming assembly from a first state to a second state 804

Activate the actuator based on the instruction
806

Figure 8

WEARABLE HAPTIC DEVICES WITH JAMMING ASSEMBLIES FOR HAPTIC JAMMING

TECHNICAL FIELD

This application relates generally to haptic stimulation, including but not limited to creating haptic stimulations on users of virtual and/or augmented reality devices.

BACKGROUND

Virtual and augmented reality devices have wide applications in various fields, including engineering design, medical surgery practice, military simulated practice, and video gaming. Haptic or kinesthetic stimulations recreate the sense of touch by applying forces, vibrations, and/or motions to a user, and are frequently implemented with virtual and augmented reality devices. In certain applications, haptic stimulations are desired at locations where dexterity and motion of the user cannot be impeded. Conventional haptic devices, however, are cumbersome and therefore impede dexterity and motion of the user.

SUMMARY

Accordingly, there is a need for devices and systems that do not impede dexterity and motion of a user when in a first state (e.g., an unjammed state), and that create haptic stimulations when in a second state (e.g., a jammed state). One solution is a haptic device that includes novel jamming assemblies that are not located on the portion of a wearer's body that is to be constrained (e.g., the jamming assembly is fixed to the back of the user's hand, and therefore away from the wearer's finger, which is to be constrained). The haptic device also includes elongated elements, which are attached to the portion of the wearer's body that is to be constrained. Each elongated element is configured to move with the portion of the wearer's body (e.g., bend and flex in response to the user curling his or her finger), at least until the portion of the body is constrained by the associated jamming assembly. Further, the haptic device is able to provide a substantial jamming force, such that the wearer is unable to overcome the jamming force, which improves the virtual and/or augment reality experience for the user.

(A1) In accordance with some embodiments, the solution explained above can be implemented on a haptic device that includes a jamming assembly (or a plurality of jamming assemblies) anchored to the back of a user's hand. The jamming assembly includes (i) a jamming lever, (ii) an actuator to move the jamming lever from a first position to a second position different from the first position, and (iii) a slidable ratchet (e.g., a slidable member or slidable mechanism) configured to move back and forth in response to movement of a first of the user's fingers (e.g., when the jamming lever is in the first position). The haptic device further includes an elongated element (or a plurality of elongated elements) with opposing first and second end portions, where (i) the first end portion is anchored to a predefined portion of the user's first finger, and (ii) the second end portion is attached to an end portion of the slidable ratchet. Further, the jamming lever, when moved to the second position by the actuator, engages with an engagement portion of the slidable ratchet to prevent movement of the slidable ratchet, the elongated element, and the user's first finger in at least one direction.

(A2) In accordance with some embodiments, a method is provided that is used to create haptic stimulations. The method is performed by the haptic device of (A1). The method comprises receiving, by the haptic device, an instruction (e.g., from a computer system 130, FIG. 1) to transition the actuator of the jamming assembly from a first state to a second state (e.g., transition from the state shown in FIG. 5B-1 to the state shown in FIG. 5B-2). The method further includes, in response to receiving the instruction, activating the actuator based on the instruction. When transitioned to the second state, the actuator moves the jamming lever from a first position to a second position. Doing so causes the jamming lever to engage with an engagement portion of the slidable ratchet (e.g., slidable member or slidable mechanism) to prevent movement of the slidable ratchet, the elongated element, and the user's first finger in at least one direction. To further illustrate, the haptic device can be in communication with a computer system (e.g., a virtual reality device and/or an augmented reality device), and the haptic device can stimulate the body based on an instruction from the computer system. As an example, the computer system may display media content to a user (e.g., via a head-mounted display), and the computer system may also instruct the haptic device to create haptic stimulations that correspond to the media content displayed to the user and/or other information collected by the haptic device (e.g., via sensors included with the haptic device) and/or the head-mounted display.

(A3) In accordance with some embodiments, a haptic device to be worn by a user is provided. The haptic device includes a jamming assembly and an elongated element coupled to the jamming assembly. The elongated element is coupled to a first portion of the user's body (e.g., coupled to at least one phalange of a first of the user's fingers) and the jamming assembly is coupled to a second portion, different from the first portion, of the user's body (e.g., coupled to the back of the user's hand). The jamming assembly and the elongated element collectively are used to impede movement of the first portion of the user's body, while movement of the second portion of the user's body is not impeded by the jamming assembly or the elongated element. To illustrate, the jamming assembly includes an actuator, and when the actuator is in a first state, the elongated element is configured to freely move with movement of the first portion of the user's body (e.g., move up and down when the user moves his or her first finger up and down). However, when the actuator is in a second state, the jamming assembly prevents movement of the elongated element (i.e., the elongated element is jammed). Additionally, because the elongated element is coupled to the first portion of the user's body, the user is unable to move the first portion of his or her body when the actuator is in the second state. Thus, the jamming assembly is able to impede movement of the first portion of the user's body without being positioned on the first portion of the user's body. Further, the jamming assembly is able to accomplish the impedance with a single actuator (e.g., when the first portion of the user's body is a finger, movement of the metacarpophalangeal joint and proximal interphalangeal joint is prevented).

(A4) In some embodiments of any of A1-A3, the user's first finger includes a dorsal surface and a palmar surface opposite the dorsal surface and the elongated element is adjacent to the dorsal surface of the user's first finger.

(A5) In some embodiments of A4, the haptic device provided further includes a first bracket sized for the predefined portion of the user's first finger. Additionally, the first bracket anchors the first end portion of the elongated element to the predefined portion of the user's first finger.

(A6) In some embodiments of A5, the predefined portion of the user's first finger is an intermediate phalange of the user's first finger.

(A7) In some embodiments of A5, the predefined portion of the user's first finger is a distal phalange of the user's first finger.

(A8) In some embodiments of any of A6-A7, the haptic device provided further includes a second bracket sized for a proximal phalange of the user's first finger. Additionally, a middle portion, between the first and second end portions of the elongated element, is slideably attached to the proximal phalange of the user's first finger by the second bracket.

(A9) In some embodiments of A8, the second bracket includes a rail that substantially parallels a dorsal surface of the proximal phalange of the user's first finger. Additionally, the elongated element includes a connector attached to the rail, the connector being configured to slide along the rail in response to movement of the user's first finger (e.g., when the jamming lever is in the first position).

(A10) In some embodiments of any of A1-A9, the actuator is configured to move the jamming lever from the first position to the second position in response to receiving instructions from a computing device.

(A11) In some embodiments of A10, the haptic device provided further includes a controller in communication with the computing device. The controller is configured to receive the instructions from the computing device and control operation of the actuator based on the instructions. In some embodiments, the instructions correspond to content displayed on the electronic display. Alternatively or in addition, the instructions correspond to spatial and motion data generated by sensors attached to the haptic device.

(A12) In some embodiments of any of A1-A11, the engagement portion of the slidable ratchet (e.g., slidable member) includes a plurality of closely-spaced positive-locking teeth (e.g., grooves).

(A13) In some embodiments of A12, the slideable ratchet includes opposing first and second surfaces and opposing first and second end portions. Furthermore, (i) the second end portion of the elongated element is slideable attached to the second surface of the slideable ratchet at the first end portion of the slideable ratchet, (ii) the second end portion of the slideable ratchet, along at least a portion of the second surface of the slideable ratchet, includes the plurality of closely-spaced positive-locking teeth, and (iii) an end portion of the jamming lever fits between two or more of the plurality of closely-spaced positive-locking teeth when the jamming lever engages with the engagement portion of the slideable ratchet.

(A14) In some embodiments of any of A1-A13, the jamming assembly is anchored to the back of the user's hand near a proximal base of a first of the user's knuckles.

(A15) In some embodiments of any of A1-A14, the jamming assembly further includes an energy source to power the actuator.

(A16) In some embodiments of any of A1-A14, the actuator is pneumatically coupled, via tubing, to a pneumatic device, and the pneumatic device is configured to control operation of the actuator.

(A17) In some embodiments of any of A1-A16, the jamming assembly further includes a spring contacting the jamming lever. Additionally, in a first state, the actuator is configured to apply a first force to the jamming lever that does not overcome an opposing force applied to the jamming lever by the spring. Moreover, in a second state, the actuator is configured to apply a second force to the jamming lever that overcomes the opposing force applied to the jamming lever by the spring, thereby causing the jamming lever to move from the first position to the second position.

(A18) In some embodiments of any of A1-A17, the slideable ratchet is configured to slide in opposing first and second directions in response to movements of the user's first finger.

(A19) In some embodiments of any of A1-A18, the haptic device provided further includes a secondary jamming assembly that includes (i) a secondary jamming lever, (ii) a secondary actuator to move the secondary jamming lever from a first position to a second position different from the first position, and (iii) a rotatable ratchet (e.g., a rotatable member). Additionally, when moved to the second position by the secondary actuator, the secondary jamming lever engages with an engagement portion of the rotatable ratchet to prevent movement of the rotatable ratchet, the secondary elongated element, and the user's first finger in a second direction different from the at least one direction.

(A20) In some embodiments of any of A1-A19, the haptic device provided further includes a plurality of jamming assemblies, including the first jamming assembly, and each of the plurality of jamming assemblies is associated with a respective one of the user's fingers.

(A21) In some embodiments of A20, the haptic device provided further includes a plurality of elongated elements, including the first elongated element, and each of the plurality of jamming assemblies is attached to a respective one of the plurality of elongated elements.

(B1) In accordance with some embodiments, the solution explained above can be implemented on a haptic device that includes a haptic assembly (e.g., variable-stiffness actuator assembly 700, FIG. 7A) (or a plurality of haptic assemblies) anchored to the back of a user's hand. The haptic assembly includes (i) a slideable clamp and (ii) at least two antagonistically arranged (i.e., opposing) inflatable bladders disposed around the slideable clamp. The at least two inflatable bladders are coupled (e.g., pneumatically) to a pressure regulating device that is configured to pressurize one (or both) of the at least two inflatable bladders. In some embodiments, the haptic assembly includes tubing that is configured to deliver a medium (e.g., air, gas, fluid, etc.) to each of the inflatable bladders from the pressure regulating device. The haptic assembly is configured to apply bidirectional forces and impedances to one of the user's fingers by creating a pressure difference between the at least two inflatable bladders (e.g., the pressure regulating device creates the pressure difference between the at least two inflatable bladders).

(B2) In some embodiments of B1, the pressure regulating device is in communication with a remote computer system, and the pressure regulating device is configured to change a pressure inside one (or both) of the at least two inflatable bladders in response to receiving one or more signals from the remote computer system. Alternatively, in some embodiments, the haptic device is in communication with the remote computer system and the pressure regulating device. Further, the haptic device receives the one or more signals from the remote computer system and controls operation of the pressure regulating device based on the one or more signals.

(B3) In some embodiments of B2, the remote computer system is in communication with a head-mounted display that presents content to the wearer, the head-mounted display including an electronic display. Furthermore, the one or more signals correspond to content displayed on the electronic display.

(B4) In some embodiments of B3, the haptic device further includes one or more sensors configured to generate spatial and motion data corresponding to the wearer's movements. Additionally, the spatial and motion data are communicated to the remote computer system.

(B5) In some embodiments of B4, the one or more signals further correspond to the spatial and motion data corresponding to the wearer's movements, and the one or more signals are generated by the remote computer system to impede the wearer's movements.

Although the embodiments discussed above concern a user's hand, the haptic device in some instances is worn on other portions of the user's body (e.g., an arm, a wrist, or an ankle) and can be used to stimulate various areas of the body.

Thus, the devices, methods, and systems described herein provide benefits including but not limited to: (i) stimulating areas of the body that correspond to media content and sensor data; (ii) the haptic device does not encumber free movement of a user's body, until desired; (iii) mechanisms (e.g., the jamming assemblies) for creating the stimulations can be located away from the portion of the body that experiences the stimulation; and (iv) a single actuator can be used to prevent movement of a user's finger in at least one direction (i.e., restrict at least one degree of freedom).

In accordance with some embodiments, a haptic device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium has stored therein instructions that, when executed by one or more processors/cores of a haptic device, cause the haptic device to perform the operations of any of the methods described herein. In accordance with some embodiments, a system includes a haptic device, a head-mounted display (HMD), and a computer system to provide video/audio feed to the HMD and instructions to the haptic device and the HMD.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 5B-1 and 5B-2 show the jamming assembly of FIG. 5A transitioning from an unjammed state to a jammed state in accordance with some embodiments.

FIG. 7B shows a representative slideable clamp in accordance with some embodiments.

FIG. 8 shows a flowchart of a method for generating haptic stimulations in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

Figure 1:
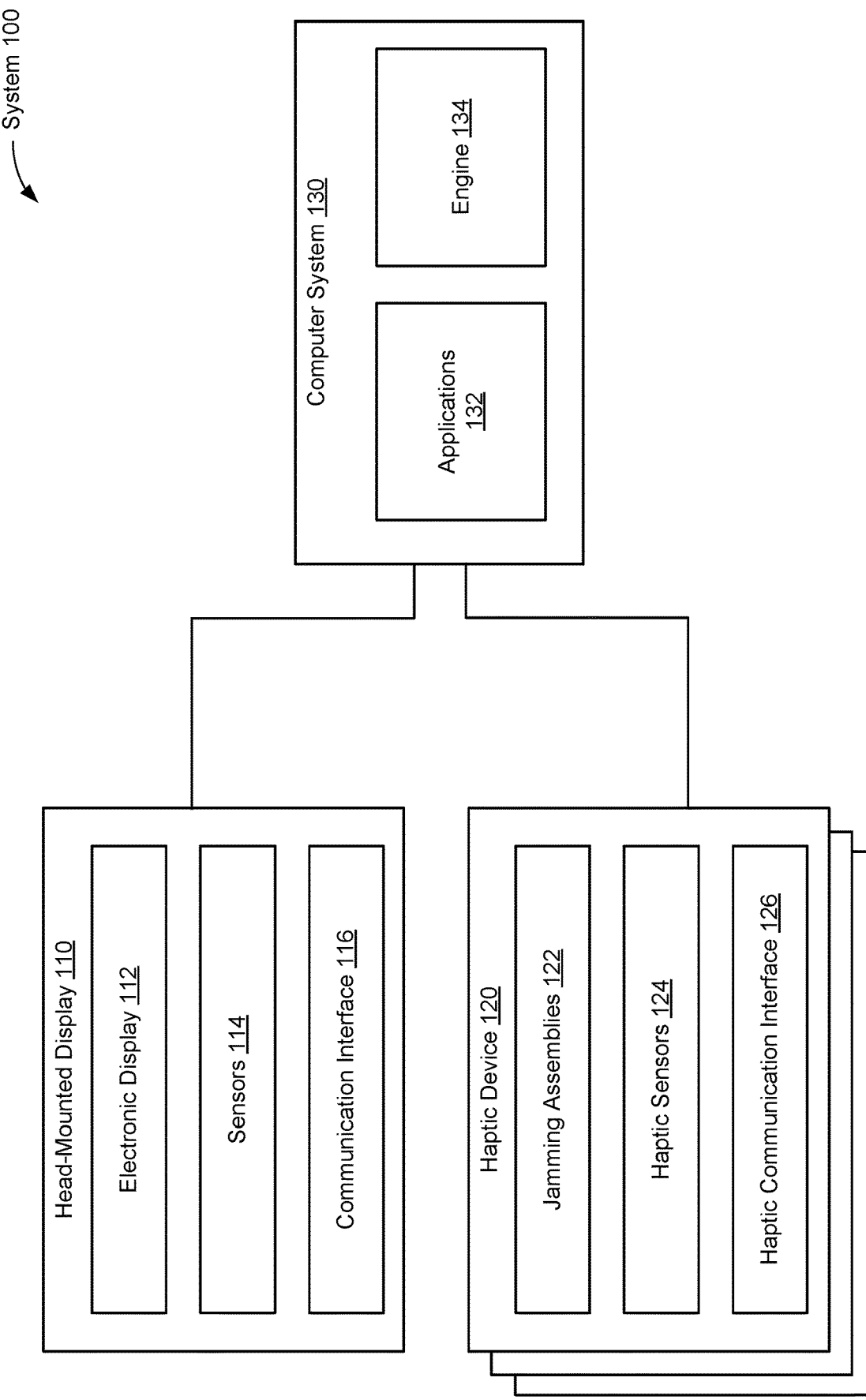
FIG. 1 is a block diagram of a haptics system, in accordance with various embodiments.

FIG. 1 is a block diagram of a virtual-reality (and/or augmented reality) system 100 in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more haptic devices 120 (sometimes referred to as "wearable devices"), which are used in conjunction with a computer system 130 (sometimes referred to a "remote computer system") and a head-mounted display 110. In some embodiments, the system 100 provides the functionality of a virtual reality device with haptic feedback, an augmented reality device with haptic feedback, or a combination thereof.

The head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information.

The head-mounted display 110 includes an electronic display 112, sensors 114, and a communication interface 116. The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display 110 to the computer system 130. In such embodiments, the communication interface 116 may also receive audio/visual data to be rendered on the electronic display 112.

The haptic device 120 includes a garment worn by the user (e.g., a glove, a shirt, or pants). In some embodiments, the haptic device 120 collects information about a portion of the user's body (e.g., the user's hand) that can be used as input for virtual reality applications 132 executing on the computer system 130. In the illustrated embodiment, the haptic device 120 includes a jamming assembly 122, haptic sensors 124, and a haptic communication interface 126. The haptic device 120 may include additional components that are not shown in FIG. 1, such as a power source (e.g., an integrated battery, a connection to an external power source, a container containing compressed air, or some combination thereof), one or more processors, and memory.

Figure 3A:
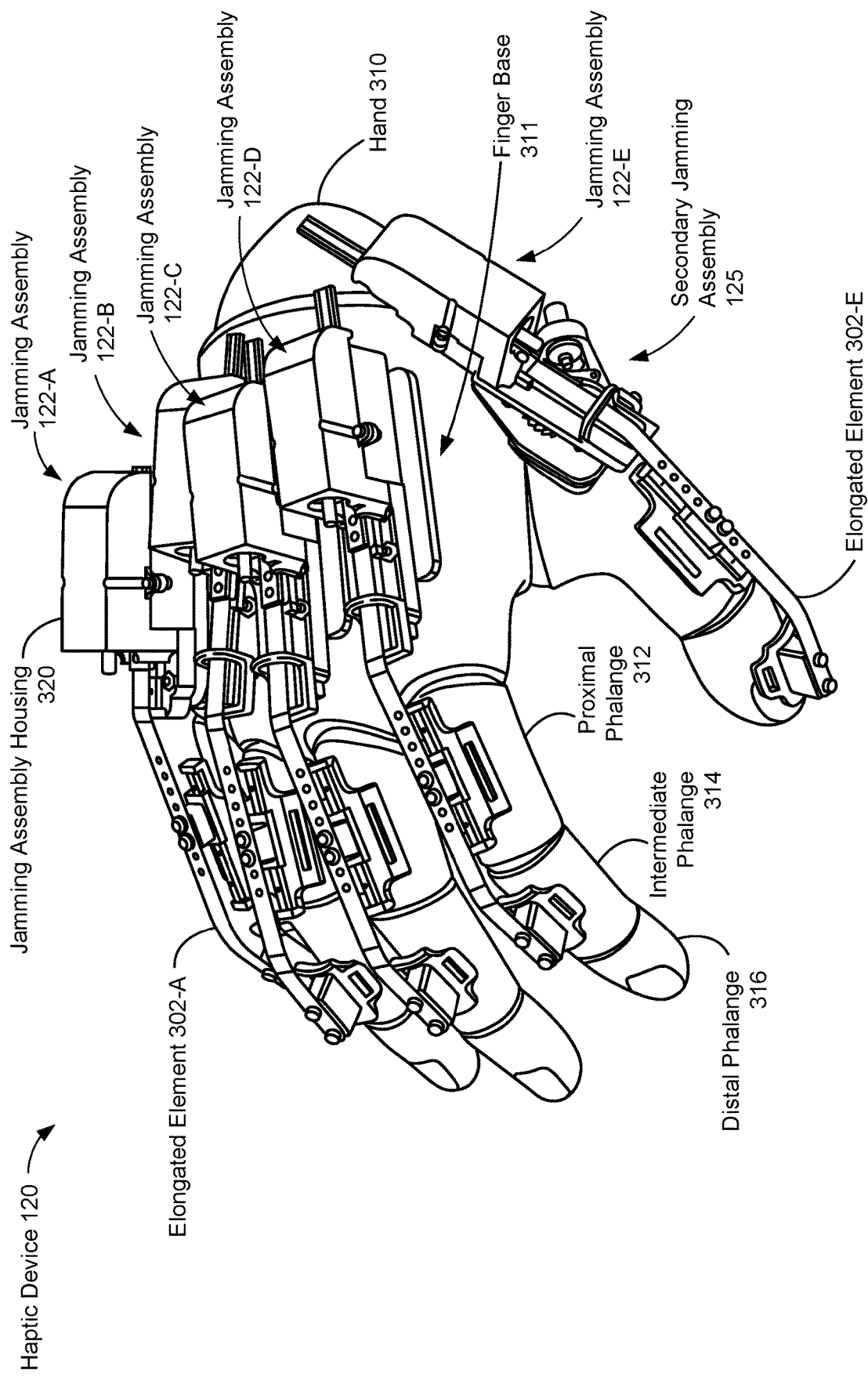
FIG. 3A shows an isometric view of a representative haptic device in accordance with some embodiments.

The jamming assembly 122 provides haptic feedback (i.e., haptic stimulations) to the user by preventing a portion of the user's body from moving in certain ways (i.e., used for haptics jamming). To accomplish this, the jamming assembly 122 is configured to, by generating a fairly small amount of force (e.g., via an actuator 202), prevent movement of the user's body (e.g., one of the user's fingers). In fact, the jamming assembly is capable of applying resistive forces that are orders of magnitude higher than a force capable of being generated by a user's finger. To provide some context, each jamming assembly can resist forces of the order of 100 Newtons in the direction in which the ratchet (e.g., the slidable member) slides. This jamming force could be further increased by manufacturing all components of the jamming assembly out of metal. Various embodiments of the jamming assembly 122 are discussed below with reference to FIGS. 3A through 7. It is noted that each haptic device 120 may include one or more jamming assemblies 122 (e.g., one or more (or each) of the user's fingers may have an associated jamming assembly 122, as shown in FIG. 3A). For ease of discussion, the user's thumb is deemed to be one of the user's fingers, unless the described embodiment is unique to the user's thumb.

The haptic sensors 124 include one or more hardware devices that detect spatial and motion information about the haptic device 120. Spatial and motion information can include information about the position, orientation, velocity, rotation, and acceleration of the wearable device 110 or any subdivisions of the haptic device 120, such as fingers, fingertips, knuckles, the palm, or the wrist when the haptic device 120 is part of a glove. The haptic sensors 124 may be IMUS, as discussed above with reference to the sensors 114.

The haptic communication interface 126 enables input and output to the computer system 130. In some embodiments, the haptic communication interface 126 is a single communication channel, such as USB. In other embodiments, the haptic communication interface 126 includes several distinct communication channels operating together or independently. For example, the communication interface 126 may include separate communication channels for receiving control signals for the jamming assembly 122 and sending data from the haptic sensors 124 to the computer system 130. The one or more communication channels of the haptic communication interface 126 can be implemented as wired or wireless connections. In some embodiments, the haptic communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug, etc.), and/or any other suitable communication protocol, including communication protocols not yet developed as of the filing date of this document.

The computer system 130 is a computing device that executes virtual reality applications and/or augmented reality applications to process input data from the sensors 114 on the head-mounted display 110 and the haptic sensors 124 on the haptic device 120. The computer system 130 provides output data for (i) the electronic display 112 on the head-mounted display 110 and (ii) the jamming assembly 122 on the haptic device 120.

In some embodiments, the computer system 130 sends instructions (e.g., the output data) to the haptic device 120. In response to receiving the instructions, the haptic device 120 creates one or more haptic stimulations (e.g., using an associated actuator 202). Alternatively, in some embodiments, the computer system 130 sends instructions to an external device, such as a pneumatic device, and in response to receiving the instructions, the external device creates one or more haptic stimulations through the haptic device 120

(e.g., the output data bypasses the haptic device 120). Alternatively, in some embodiments, the computer system 130 sends instructions to the haptic device 120, which in turn sends the instructions to the external device. The external device then creates one or more haptic stimulations through the haptic device 120. Although not shown, in the embodiments that include a distinct external device, the external device may be connected to the head-mounted display 110, the haptic device 120, and/or the computer system 130 via a wired or wireless connection. The external device may be a pneumatic device, a hydraulic device, some combination thereof, or any other device capable of adjusting pressure.

The computer system 130 can be implemented as any kind of computing device, such as an integrated system-on-a-chip, a microcontroller, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 further includes virtual-reality (and/or augmented-reality) applications 132 and a virtual reality (and/or augmented reality) engine 134. In some embodiments, the virtual-reality applications 132 and the virtual-reality engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

Each virtual-reality application 132 is a group of instructions that, when executed by a processor, generates virtual reality content for presentation to the user. A virtual-reality application 132 may generate virtual-reality content in response to inputs received from the user via movement of the head-mounted display 110 or the wearable device 120. Examples of virtual-reality applications 132 include gaming applications, conferencing applications, and video playback applications.

The virtual-reality engine 134 is a software module that allows virtual-reality applications 132 to operate in conjunction with the head-mounted display 110 and the haptic device 120. In some embodiments, the virtual-reality engine 134 receives information from the sensors 114 on the head-mounted display 110 and provides the information to a virtual-reality application 132. Based on the received information, the virtual-reality engine 134 determines media content to provide to the head-mounted display 110 for presentation to the user via the electronic display 112 and/or a type of haptic feedback to be created by the haptic device 120. For example, if the virtual-reality engine 134 receives information from the sensors 114 on the head-mounted display 110 indicating that the user has looked to the left, the virtual-reality engine 134 generates content for the head-mounted display 110 that mirrors the user's movement in a virtual environment.

Similarly, in some embodiments, the virtual-reality engine 134 receives information from the haptic sensors 124 on the haptic device 120 and provides the information to a virtual-reality application 132. The application 132 can use the information to perform an action within the virtual world of the application 132. For example, if the virtual-reality engine 134 receives information from the sensors 124 that the user has closed his fingers around a position corresponding to a coffee mug in the virtual environment and raised his hand, a simulated hand in the virtual-reality application 132 picks up the virtual coffee mug and lifts it to a corresponding height. As noted above, the information received by the virtual-reality engine 134 can also include information from the head-mounted display 110. For example, cameras on the head-mounted display 110 may capture movements of the wearable device 120, and the application 132 can use this additional information to perform the action within the virtual world of the application 132.

The virtual-reality engine 134 may also provide feedback to the user that the action was performed. The provided feedback may be visual via the electronic display 112 in the head-mounted display 110 (e.g., displaying the simulated hand as it picks up and lifts the virtual coffee mug) and/or haptic feedback via the one or more jamming assemblies 122 in the haptic device 120. For example, the haptic feedback may prevent one or more of the user's fingers from curling past a certain point to simulate the sensation of touching a solid coffee mug. To do this, the haptic device 120 activates (either directly or indirectly) an actuator 202 included in the jamming assembly 122. Each of the jamming assemblies 122 includes a jamming lever (e.g., jamming element, jamming component, jamming mechanism) 204 that, when engaged by the actuator 202, at a minimum, prevents movement of the user's finger in at least one direction (e.g., the user cannot curl his or her finger). The workings of each jamming assembly 122 are described in further detail below with reference to FIGS. 3A to 7.

The jamming assemblies 122 described herein are configured to transition between a first state (e.g., a non-engaged state or an unjammed state) and a second state (e.g., an engaged state or a jammed state) to provide haptic feedback to the user (e.g., a jamming stimulation). Due to the ever-changing nature of virtual and augmented reality, the jamming assemblies 122 may be required to transition between the two states hundreds, or perhaps thousands of times, during a single session. Thus, the jamming assemblies 122 described herein are durable and designed to quickly transition from state to state. To provide some context, in the first state, the jamming assemblies 122 do not impede free movement of a portion of the wearer's body. For example, each of jamming assemblies 122 includes a slidable ratchet (e.g., member) 206 that freely moves with the movement of the user's finger (e.g., slides linearly back and forth). However, in the second state, the jamming assemblies 122 are configured to impede free movement of the portion of the wearer's body, and in some cases, completely stop movement of the portion of the wearer's body in at least one direction. For example, a jamming assembly 122 can prevent a wearer's finger from curling when the jamming assembly 122 is in the second state. In another example, another jamming assembly 125 (which is similar to the jamming assembly 122) can prevent abduction or adduction movement of the wearer's finger when the jamming assembly 122 is in the second state.

As mentioned above, the haptic stimulations created by the haptic device 120 can correspond to data displayed by the head-mounted display 110 (e.g., the coffee mug example from above). Thus, the haptic device 120 is used to further immerse the user in virtual and/or augmented reality experience such that the user not only sees (at least in some instances) the data on the head-mounted display 110, but the user may also "feel" certain aspects of the displayed data. Moreover, the haptic device 120 is designed to not restrict movement of the user's hand (or other body part), until desired. Furthermore, by not placing the jamming assemblies 122 directly on the wearer's fingers, the wearer experiences far less unwanted encumbrances when wearing the haptic device 120.

Figure 2:
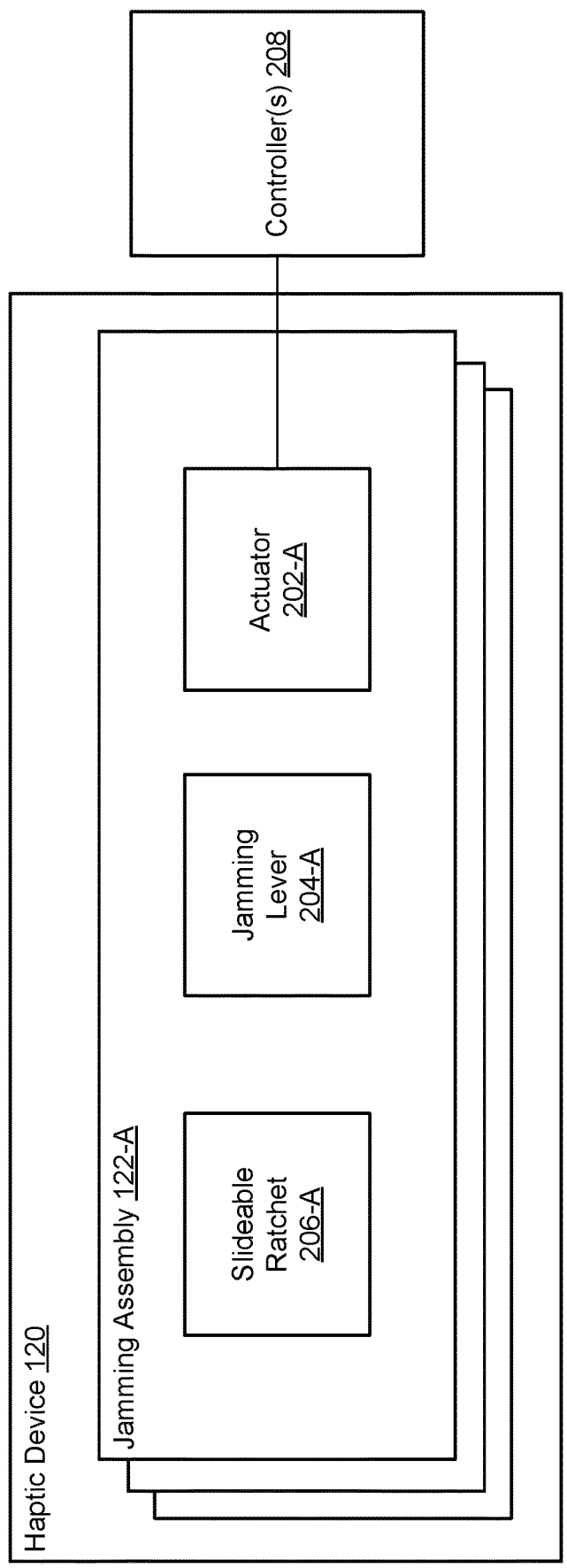
FIG. 2 is a schematic of a representative haptic device in accordance with some embodiments.

FIG. 2 is a schematic of a representative haptic device 120 in accordance with some embodiments. The components in FIG. 2 are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

Figure 3B:
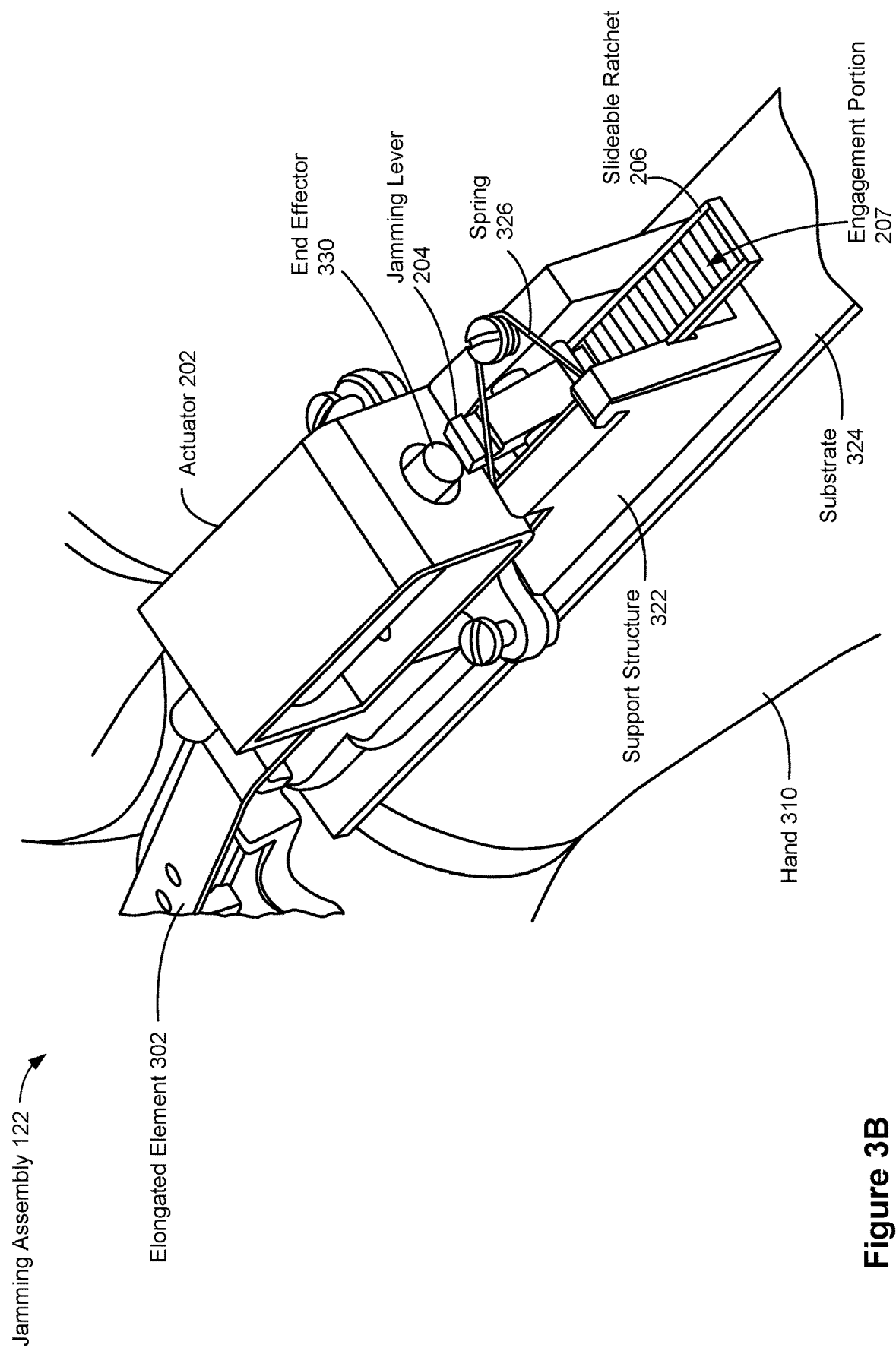
FIG. 3B shows a close-up isometric view of a representative jamming assembly in accordance with some embodiments.

As a non-limiting example, the representative haptic device 120 includes a plurality of jamming assemblies 122-A, 122-B, . . . 122-E. As explained above, the jamming assemblies 122 are configured to provide haptic stimulations to a wearer of the haptic device 120 (e.g., prevent movement of a portion of the wearer's body). Although not shown, the representative haptic device 120 is part of a garment, which can be various articles of clothing (e.g., gloves, socks, shirts, or pants), and thus, the user may wear multiple haptic devices 120 that provide haptic stimulations to different parts of the body. Further, each jamming assembly 122 includes an actuator 202, a jamming lever 204, and a slidable ratchet 206 (also referred to herein as a "slidable member" 206). The actuator 202 is configured to actuate between first and second states. In the first state, a contacting portion (e.g., an end effector 330 as shown in FIG. 3B) of the actuator 202 does not contact (or apply a sufficient force) to the jamming lever 204. However, in the second state, the contacting portion of the actuator contacts and forces the jamming lever 204 to engage with a portion (e.g., the engagement portion 207 in FIG. 3B) of the slidable ratchet 206. In doing so, the slidable ratchet 206 is prevented from moving in at least one direction (i.e., the slidable ratchet 206 can no longer slide), and in turn, the user's finger is also prevented from moving in the at least one direction (e.g., movement of the metacarpophalangeal joint and proximal interphalangeal joint is prevented in flexion). The jamming lever 204 and the slidable ratchet 206 are discussed in further detail below.

Figure 3C:
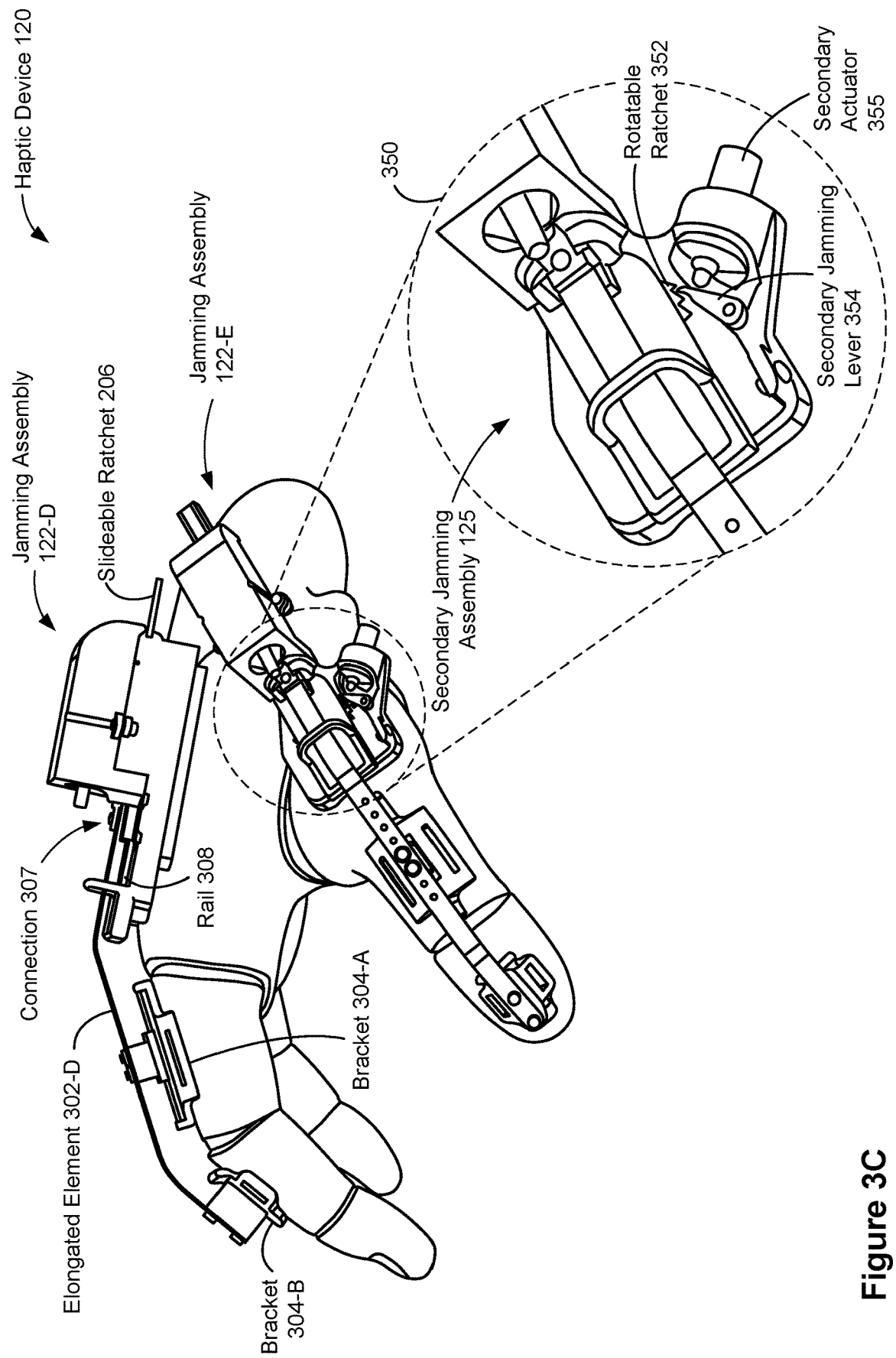
FIG. 3C shows a side view of a representative haptic device in accordance with some embodiments.
Figure 3D:
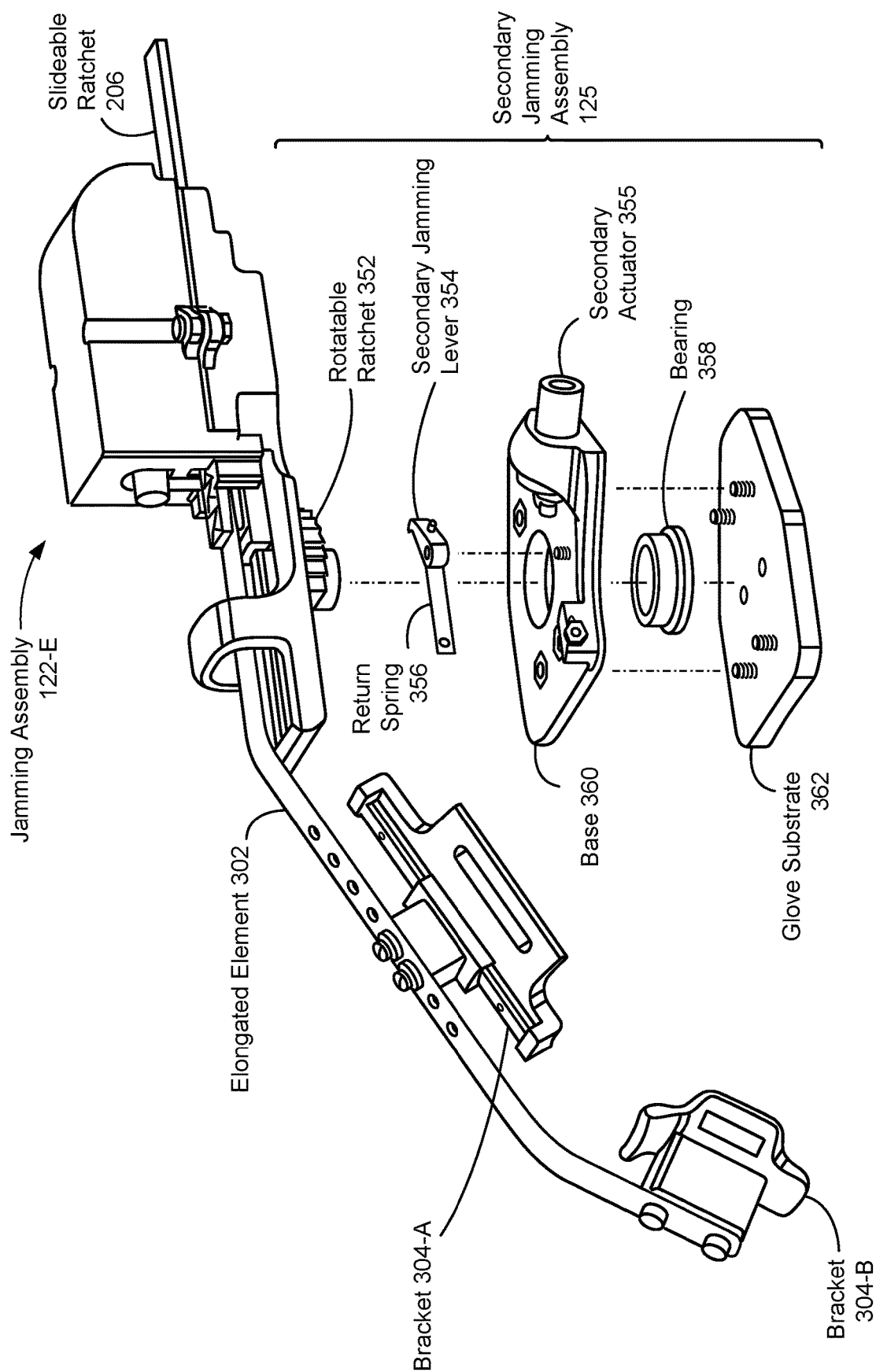
FIG. 3D shows an exploded view of a jamming assembly attached to the user's thumb in accordance with some embodiments.

In some embodiments, the haptic device 120 includes one or more secondary jamming assemblies, such as the secondary jamming assembly 125 shown in FIGS. 3C and 3D. One or more secondary jamming assemblies 125 may be included in an example haptic device 120 to prevent movement of one of the user's fingers in another direction different from the at least one direction. A representative secondary jamming assembly 125 includes another actuator 355, another jamming lever 354, and a rotatable ratchet 352 (also referred to herein as a "rotatable member"). The jamming assembly 125 is discussed in further detail below with reference to FIGS. 3C and 3D.

In some embodiments, the actuator 202 is an electromagnetic actuator. Alternatively, in some embodiments, the actuator 202 is a pneumatically powered actuator. Some other type of actuators that could be used are shape memory alloy actuators and hydraulically powered actuators, or any other actuator capable of moving the jamming lever 204 as described herein.

The representative haptic device 120 also includes (or is in communication with) a controller 208. In those embodiments where the controller 208 is part of the haptic device 120, the controller 208 is communicatively coupled with the communication interface 126. In some embodiments, the controller 208 is part of the computer system 130 (e.g., the processor of the computer system 130). The controller 208 is configured to control operation of the actuator 202, and in turn, operation of the haptic devices 120. For example, the controller 208 sends one or more signals that activate the actuator 202 (e.g., activation of the actuator 202 causes the actuator 202 to transition between its first and second states, and vice versa). Generation of the one or more signals may be based on information collected by the sensors 114 and/or the sensors 124 (FIG. 1). For example, the one or more signals may cause the actuator 202 to prevent movement of one or more of the user's fingers, based on the information collected by the sensors 114 and/or the haptic sensors 124 (e.g., the user makes "contact" with the virtual coffee mug). The one or more signals may also cause the actuator 355 to prevent movement of one or more of the user's fingers, based on the information collected by the sensors 114 and/or the haptic sensors 124.

The devices shown in FIG. 2 may be coupled via a wired connection (e.g., via busing). Alternatively, one or more of the devices shown in FIG. 2 may be wirelessly connected (e.g., via short-range communication signals).

FIGS. 3A-3D show various views of a representative haptic device 120 in accordance with some embodiments. In particular, FIG. 3A is an isometric view of the representative haptic device 120 and FIG. 3C is a side view of the representative haptic device 120. Further, FIG. 3B is a close-up isometric view of a representative jamming assembly 122 and FIG. 3D is an exploded view of a secondary jamming assembly 125 attached to the user's thumb.

As shown in FIG. 3A, the representative haptic device 120 includes two main components: (i) elongated elements 302 and (ii) jamming assemblies 122. The elongated elements 302 are each attached to a dorsal surface of one of the user's fingers. In some embodiments, the elongated elements 302 attach to a finger in multiple places (e.g., to the proximal phalange 312 and the intermediate phalange 314, or some other phalange combination), while in some other embodiments, the elongated elements 302 attach to a finger in a single place (e.g., to an intermediate phalange of the user's finger, or some other phalange).

In some embodiments, the elongated elements 302 are made from metal (e.g., spring steel), or any other material that is substantially inextensible, but can nevertheless flex in at least one direction. Additionally, each elongated element 302 may have a different shape (e.g., cross-sectional shape and/or surface shape) that is tailored to characteristics of a specific finger of attachment. The various shapes of the elongated elements 302 are used to mimic respective strengths of the fingers, and also mimic strengths of particular portions of each finger (e.g., the proximal phalange 312 is stronger than the intermediate phalange 314, and generally carries more of a load when, say, grasping an object). As one example, a first elongated element 302 attached to the thumb may be thicker and wider than a second elongated element 302 attached to the index finger. Additionally, the first and second elongated elements may be thicker and wider towards the knuckles. By tailoring the shapes of the elongated elements 302 to specific finger characteristics, haptic stimulations provided to each of the fingers will more accurately resemble real life feedback. For example, when a person in real life picks up a cup of coffee, the stronger fingers take on and experience more of the coffee cup's load. Thus, the goal of the tailoring is to achieve a similar sensation in virtual reality when, say, an avatar in the virtual world grasps and lifts a cup of coffee.

The representative haptic device 120 of FIG. 3A includes a plurality of jamming assemblies 122-A-122-E. Each of the jamming assemblies 122-A-122-E is attached to a dorsal surface (i.e., the back) of a user's hand 310, e.g., by way of a garment, such as a glove. In particular, the jamming assemblies 122-A-122-E are positioned at a base of each of the user's fingers (e.g., jamming assembly 122-D is positioned at a base 311 of the index finger). In this way, the jamming assemblies 122-A-122-E themselves are not positioned on the user's fingers, and thus, the jamming assemblies 122-A-122-E do not encumber dexterity and motion of the user's hand 310. Instead, only the elongated elements 302 are positioned on the user's finger, and due to their design, have a limited impact of the dexterity and motion of the user's hand 310 (until desired).

Further, each of the jamming assemblies 122-A-122-E is able to generate a jamming force that prevents movement of the user's finger using a relatively small input force (the input force is the force required to move the jamming lever 204 (discussed below) from an unengaged position to an engaged position). Put another way, the user cannot overcome the jamming force by his or her own finger strength. Because a relatively small input force is all that is needed, small actuators 202 (discussed below) can be included in the jamming assemblies 122-A-122-E, which again limits an encumbrance on dexterity and motion of the user's hand 310 created by the jamming assemblies 122, and also limits the overall size of the haptic device 122. In some embodiments, the haptic device 120 includes less than five jamming assemblies 122. Each of the jamming assemblies 122 includes a jamming assembly housing 320 that houses the various components of the jamming assembly 122.

Figure 5A:
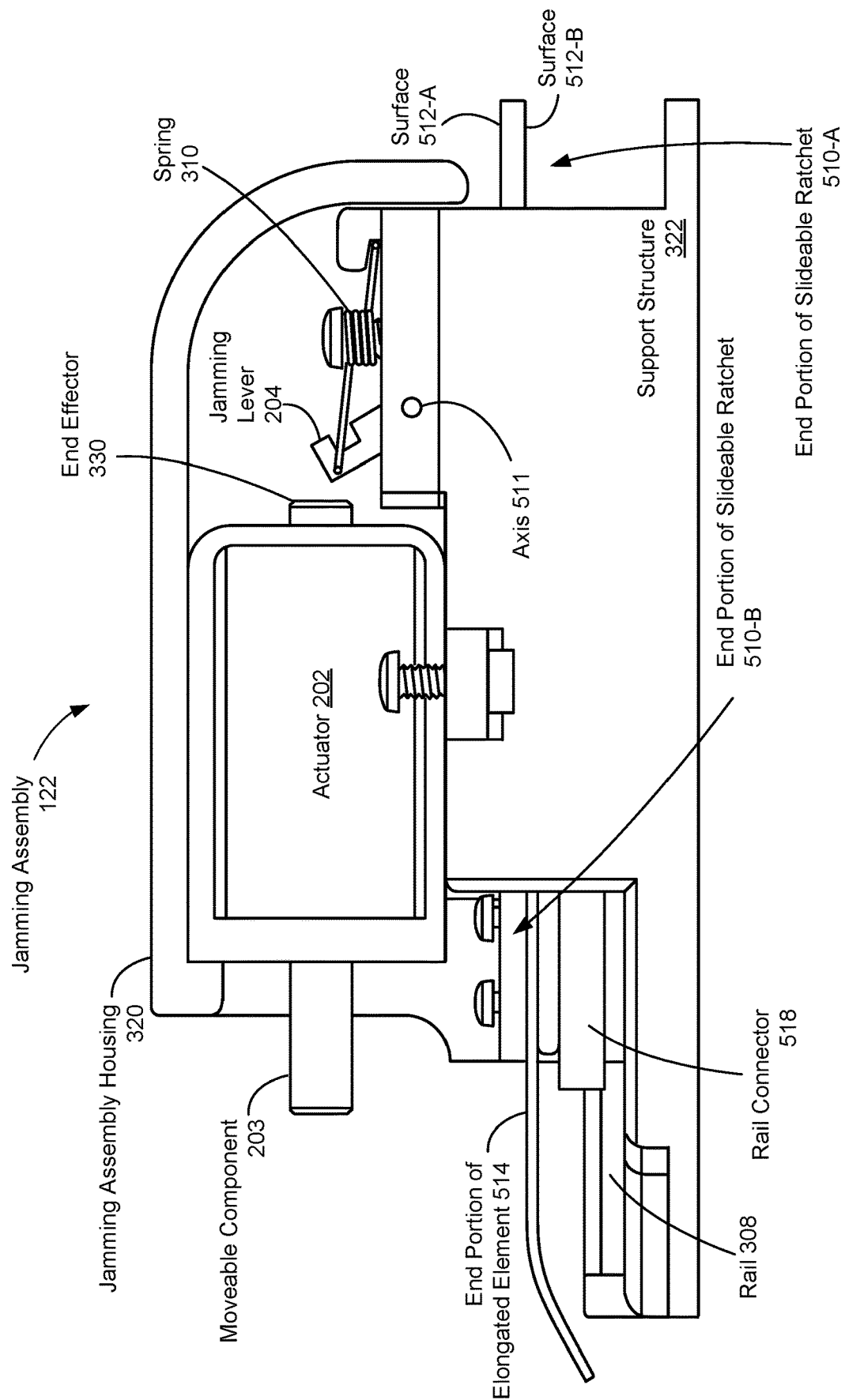
FIG. 5A shows a side view of a representative jamming assembly in accordance with some embodiments.
Figures 1, 5B:
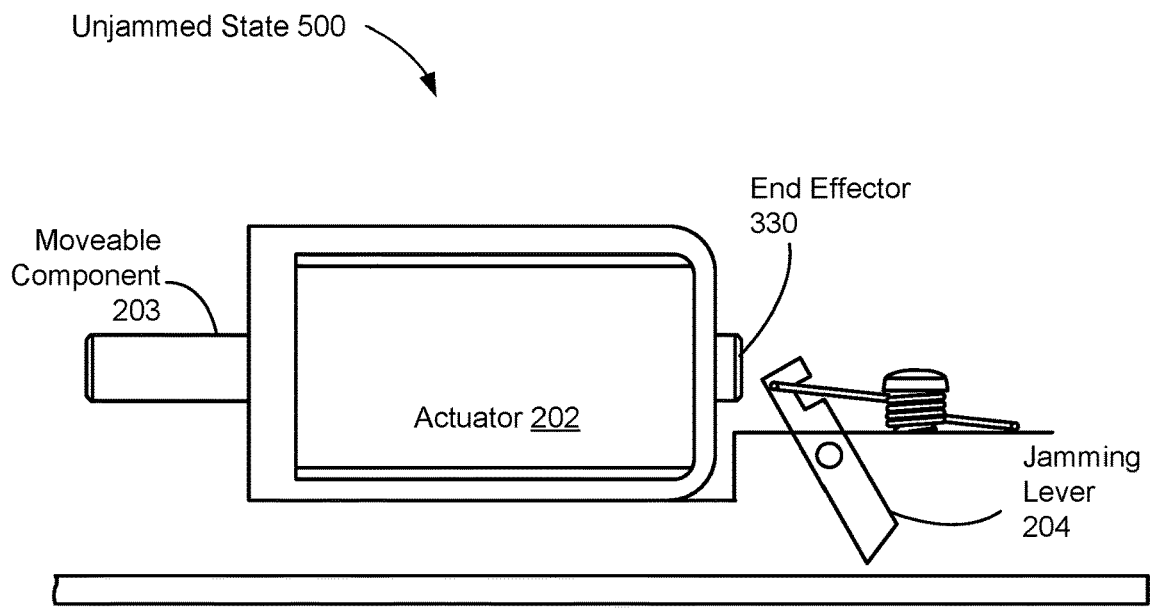
Figures 2, 5B:
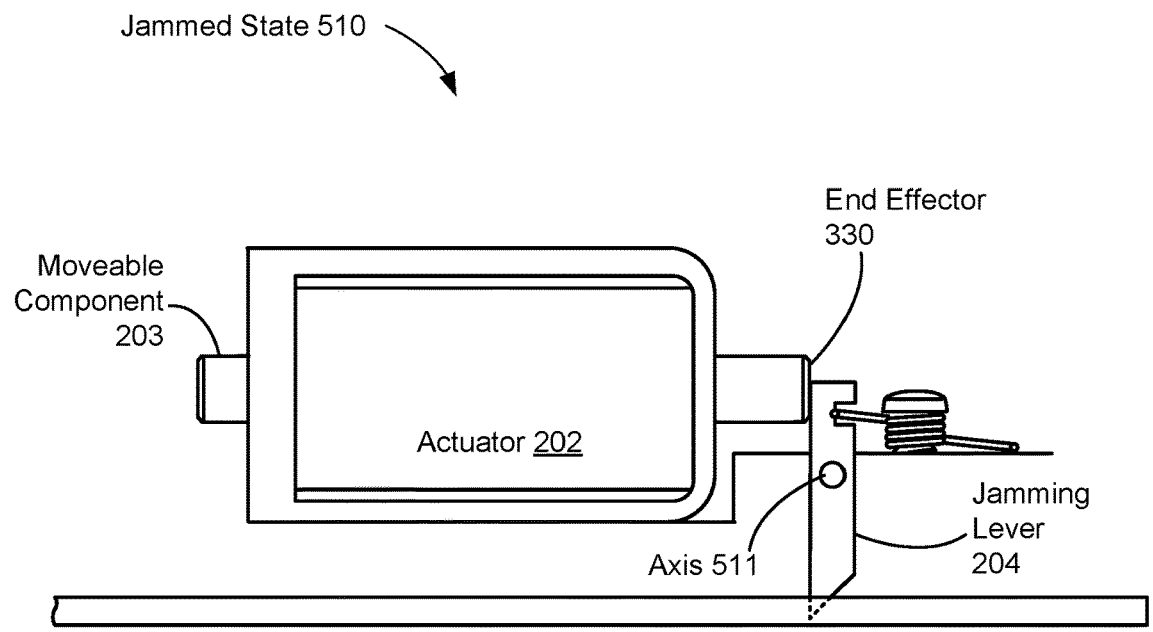

In some embodiments, a representative jamming assembly 122 includes (i) a jamming lever 204 (e.g., a pawl), (ii) an actuator 202 to move the jamming lever 204 from a first position (e.g., an unengaged position, as shown in FIG. 5B-1) to a second position (e.g., an engaged position, as shown in FIG. 5B-2), and (iii) a slidable ratchet 206 (e.g., a slidable member or slidable mechanism) configured to move (e.g., slide) back and forth in response to movement of one of the user's fingers (e.g., when the jamming lever 204 is in the first position). However, when the jamming lever 204 is moved to the second position by the actuator 202 (as shown in FIG. 5B-2), the jamming lever 204 engages with an engagement portion 207 of the slidable ratchet 206 to prevent movement of the slidable ratchet 206, the elongated element 302, and the user's finger in at least one direction. For example, when the jamming lever 204 of the jamming assembly 122-D engages with the engagement portion 207, the user is unable to curl his or her index finger, thus creating haptic feedback. Stopping the user from curling his or her index finger (and potentially other fingers simultaneously) can correspond to media content displayed by the head-mounted display 110, such that the haptic feedback may prevent one or more of the user's fingers from curling past a certain point to simulate the sensation of touching a solid object (e.g., the "coffee mug" example from above).

The enumerated components of the representative jamming assembly 122 above are used to restrict movement of the user's finger in a first direction. Further, in some embodiments, the haptic device 120 includes one or more secondary jamming assemblies 125 used to restrict movement of the user's finger is a second direction different from the first direction. As an example, the first direction is finger flexion and the second direction is adduction (or some other direction combination, e.g., abduction and extension). To restrict movement in the second direction, a representative secondary jamming assembly 125 includes (i) a secondary jamming lever 354, (ii) a secondary actuator 355 to move the secondary jamming lever 354 from a first position to a second position different from the first position, and (iii) a rotatable ratchet 352 (also referred to herein as a "rotatable member") configured to rotate in response to movement of the user's finger (which is primarily the thumb, but could be one of the fingers as well). Jamming assemblies are discussed in further detail below and the description above is provided as a brief overview.

In some embodiments, a jamming assembly 122 (or multiple jamming assemblies 122 or 125) moves the jamming lever 204 from the first position to the second position in response to receiving instructions from the computing device 130 (FIG. 1). In such embodiments, the controller 208 may activate the actuator 202 of the jamming assembly 122 (and/or the secondary actuator 355 of the secondary jamming assembly 125) to move the jamming lever 204 (and/or the secondary jamming lever 354) according to the instruction.

FIG. 3B shows a close-up isometric view of a representative jamming assembly 122 in accordance with some embodiments. The jamming assembly housing 320 as shown in FIG. 3A has been removed for ease of illustration and discussion. The jamming assembly 122 includes a support structure 322 that supports various components of the jamming assembly 122 (i.e., the components used for jamming). The support structure 322 may be made from various rigid materials, such as metals, polymers, etc. The support structure 322 is coupled (e.g., mechanically and/or adhesively) to a substrate 324 that is used to secure (e.g., anchor, fix) the jamming assembly 122 to the user's hand 310 (or some other portion of the user's body). For example, the substrate 324 may be attached to (or integrated with) a liner of a glove (or some other article of clothing) to be wore by the user. In some embodiments, each of the jamming assemblies 122 included in the haptic device 120 is attached to a common substrate (e.g., substrate 324 is combined with other similar substrates to form one large substrate that extends substantially across the back of the user's hand), which increases an anchoring strength of the jamming assemblies 122 to the glove, and in turn, the user. It is noted that, in some embodiments, the jamming assembly housing 320 and the support structure 322 form a unitary component, which may be generally referred to as the jamming assembly housing 320.

As discussed above, an example jamming assembly 122 can include (i) a jamming lever 204, (ii) an actuator 202 to move the jamming lever 204 from a first position (e.g., an unengaged position) to a second position (e.g., an engaged position), and (iii) a slidable ratchet 206 configured to move back and forth in response to movement of one of the user's fingers. For example, if the user bends his or her index finger downwards (e.g., towards his or her palm), the slidable ratchet 206 is configured to move with the user's index finger (e.g., slides away from the user's wrist towards the user's finger). Conversely, if the user extends his or her finger from a bent position, the slidable ratchet 206 is again configured to move with the user's finger (e.g., slides towards the user's wrist). In some instances, the slidable ratchet 206 is referred to as a "slidable member," a "slidable grooved-member," or a "linear ratchet" because its back and forth movement is linear. The use of the word "ratchet" in the term "slidable ratchet" herein is not meant to imply that the jamming lever 204 and the slidable ratchet 206 are constantly engaged. Instead, as discussed herein, the slidable ratchet 206 moves freely back and forth when the jamming lever 204 is in the unengaged position. As such, when the jamming lever 204 is in the unengaged position, the slidable ratchet 206 is not capable of being "ratcheted." It is not until the jamming lever 204 is in the engaged position that the slidable ratchet 206 prevents motion (e.g., using a pawl and groove arrangement, where movement is prevented in a desired direction, similar to a traditional ratchet).

Figure 6:
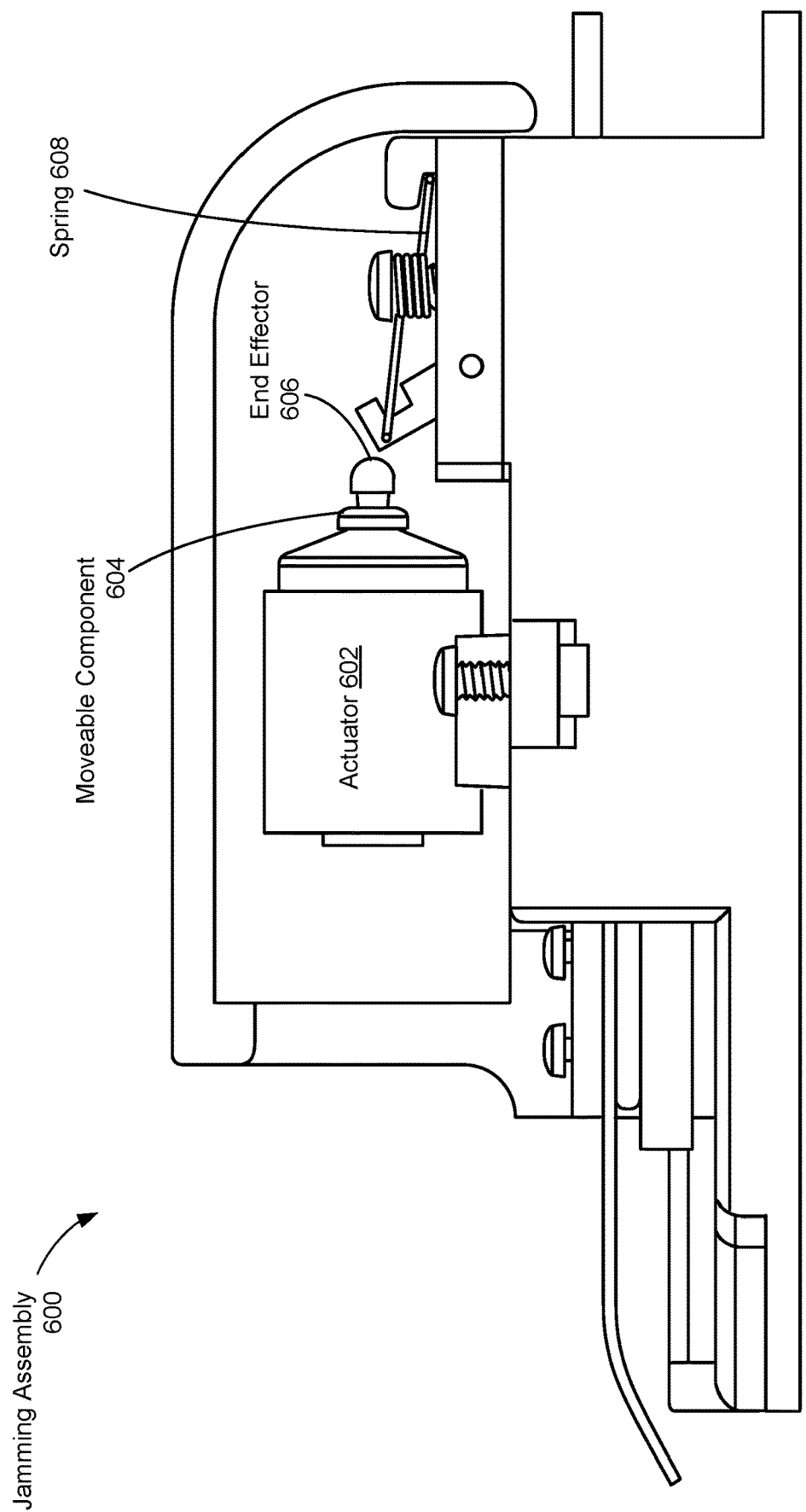
FIG. 6 shows a side view of another representative jamming assembly in accordance with some embodiments.

The actuator 202 includes a moveable component 203 (e.g., a translatable shaft as shown in FIG. 5A or an expanding bellows as shown in FIG. 6) that is configured to move between at least two positions. When the moveable component 203 is in the first position, as shown in FIG. 5B-1, an end effector 330 of the moveable component 203 is not able to rotate the jamming lever 204. However, when the moveable component 203 transitions from the first position to the second position, as shown in FIG. 5B-2, the end effector 330 of the moveable component 203 contacts a first end of the jamming lever 204 and rotates the jamming lever 204 about an axis (e.g., the axis 511 shown in FIG. 5A). In doing so, a second end (i.e., the "free end") of the jamming lever 204 engages with an engagement portion 207 of the slideable ratchet 206.

Once the jamming lever 204 engages with the engagement portion 207 of the slideable ratchet 206, the jamming assembly 122 is in a "jammed state" (when the jamming lever 204 is not engaged with the engagement portion 207, the jamming assembly 122 is in an "unjammed state"). In some embodiments, once in the jammed state, the jamming assembly 122 prevents movement of the slideable ratchet 206, the elongated element 302, and the user's finger in a single direction. For example, the user is prevented from curling his or her finger. Alternatively, in some embodiments, once in the jammed state, the jamming assembly 122 prevents movement of the slideable ratchet 206, the elongated element 302, and the user's finger in two opposing directions. For example, the user is prevented from curling or extending his or her finger.

The engagement portion 207 of the slidable ratchet (e.g., member) 206 in the illustrated embodiment includes a plurality of closely-spaced positive-locking teeth (e.g., similar to a zip tie configuration), and the second end of the jamming lever 204 in the illustrated embodiment is configured to fit between two (or more) of the plurality of closely-spaced positive-locking teeth when the free end of the jamming lever 204 engages with the engagement portion 207. With respect to the positive-locking teeth, "closely-spaced" typically means 0.5 mm-2.0 mm. Various other engagement portions can be used, so long as engagement between the jamming lever 204 and the engagement portion 207 prevents movement of the user's finger in at least one direction. For example, a cogwheel (i.e., a rotatable ratchet) could replace the slidable ratchet 206, and rotation of the cogwheel would correspond to back and forth (e.g., abduction-adduction motion) movement of one of the user's fingers. Further, the jamming lever 204 would be configured to engage with teeth of the cogwheel when in the engaged position.

In some embodiments, the representative jamming assembly 122 further includes a spring 326 coupled to the support structure 322 that contacts the jamming lever 204. The spring 326 may contact various portions of the jamming lever 204 (e.g., in the illustrated embodiment, the spring 326 contacts the first end of the jamming lever 204). The purpose of the spring 326 is to keep the jamming lever 204 and the slideable ratchet 206 disengaged when the jamming assembly 122 is in the unjammed state and also force the jamming lever 204 to disengaged from the slideable ratchet 206 when the jamming assembly 122 transitions from the jammed state to the unjammed state.

To illustrate, when the jamming assembly 122 is in the unjammed state (e.g., the jamming lever 204 is in the unengaged position), the end effector 330 of the actuator 202 does not contact the jamming lever 204, or if the end effector 330 does contact the jamming lever 204, the force applied to the jamming lever 204 by the end effector 330 does not overcome an opposing force applied to the jamming lever by the spring 326. In this way, the spring 326 keeps the jamming lever 204 and slideable ratchet 206 disengaged. However, when the jamming assembly 122 transitions from the unjammed state to the jammed state (e.g., the jamming lever 204 is in the engaged position, as shown in FIG. 5B-2), the end effector 330 presses against the jamming lever 204 and applies a force to the jamming lever 204 that overcomes the opposing force applied to the jamming lever by the spring 326. Doing so rotates the jamming lever 204 about the axis 511 and the second end of the jamming lever 204 engages with the engagement portion 207 of the slideable ratchet 206. Further, when the jamming assembly 122 transitions from the jammed state back to the unjammed state (i.e., the end effector 330 stops applying the force), the spring 326 is configured to push against the jamming lever 204 and rotate the jamming lever 204 about the axis 511. In doing so, the second end of the jamming lever 204 disengages with the engagement portion 207 of the slideable ratchet 206. The spring 326 and the end effector 330 are also discussed below with reference to FIGS. 5B-1 and 5B-2.

In some embodiments, the spring 326 is a helical torsion spring, while in other embodiments the spring 326 is a flat spring 329 (e.g., similar to the return spring 356, FIG. 3D). The flat spring 329 and the return spring 356 may be manufactured by cutting small strips from thin spring steel sheets using waterjet or other machining techniques.

Figure 3E:
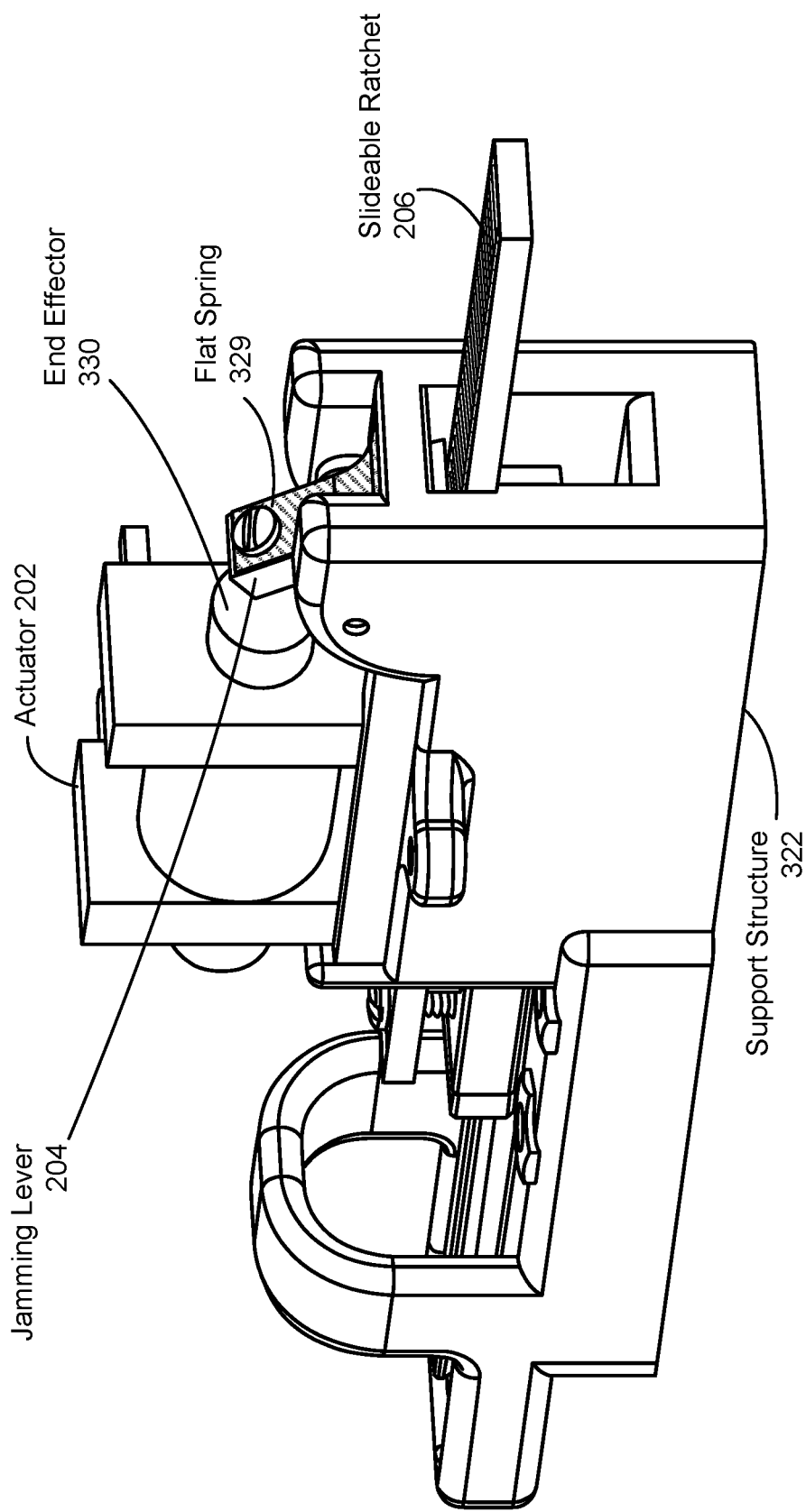
FIG. 3E shows a close-up isometric view of a representative jamming assembly in accordance with some embodiments.

FIG. 3E shows a close-up isometric view of a representative jamming assembly 122 in accordance with some embodiments. The representative jamming assembly 122 shown in FIG. 3E includes a flat spring 329 coupled to a surface of the jamming lever 204 (e.g., the jamming lever 204 has opposing first and second surfaces, where the first surface is contacted by the end effector 330 and the flat spring 329 is coupled to the second surface). The flat spring 329 pushes against the support structure 322 when the end effector 330 presses against the jamming lever 204, and when the end effector 330 ceases to press against the jamming lever 204, the flat spring 329 pushes against the jamming lever 204 and rotates the jamming lever 204 back to the disengaged position (in a similar manner to the spring 326).

Other mechanisms can be substituted for the spring 326. In some embodiments, two magnets that oppose each other are attached to the jamming lever 204 and the support structure 322. The two magnets are arranged such that they come closer together when the jamming assembly 122 is in the jammed stated, and as a result, the two magnets create a force similar to the opposing force created by the spring 326.

FIG. 3C shows a side view of the haptic device 120 in accordance with some embodiments. For ease of illustration, only the jamming assemblies 122-D and 122-E and the associated elongated elements 302 are shown. As shown, the elongated element 302 is connected, at connection 307, with the slideable ratchet 206. Further, the slideable ratchet 206 is slideably attached to a rail 308, and consequently, the elongated element 302 and the slideable ratchet 206 move (e.g., slide) together in response to movement of the user's finger. In some embodiments, the elongated element 302 is pivotably connected, at the connection 307, with the slideable ratchet 206 (e.g., the elongated element 302 pivots about a fastener connecting the elongated element 302 with the slideable ratchet 206). In such embodiments, the user is able to move his or her finger left and right, even when the jamming assembly 122 is in the jammed state (i.e., abduction and adduction of the user's finger is not substantially impeded by the jamming assembly 122). However, when the secondary jamming assembly 125 (discussed below) is attached to the user's finger, abduction and adduction of the user's finger can be substantially impeded.

In the illustrated embodiment, the elongated element 302-D is attached to a proximal phalange 312 of the user's index finger via a first bracket 304-A, and to an intermediate phalange 314 of the user's index finger via a second bracket 304-B. Alternatively, in some embodiments, the elongated element 302-D is attached to the user's index finger at some different phalange combination, or the elongated element 302-D is attached to the user's index finger at a single location (e.g., attached solely to the proximal phalange 312, the intermediate phalange 314, or the distal phalange 316). A user experience can be improved by attaching the elongated element 302 to the user's finger at multiple locations (e.g., impedances created by the jamming assembly 122 are transferred in a more realistic manner to the user's finger when multiple attachment points are used).

In some embodiments, the elongated element 302-D is slideably attached to one of the phalanges of the user's finger. For example, the elongated element 302-D is slideably attached to the proximal phalange 312 of the user's index finger via the first bracket 304-A and is fixably attached (i.e., anchored) to the intermediate phalange 314 of the user's index finger via the second bracket 304-B.

Figure 4:
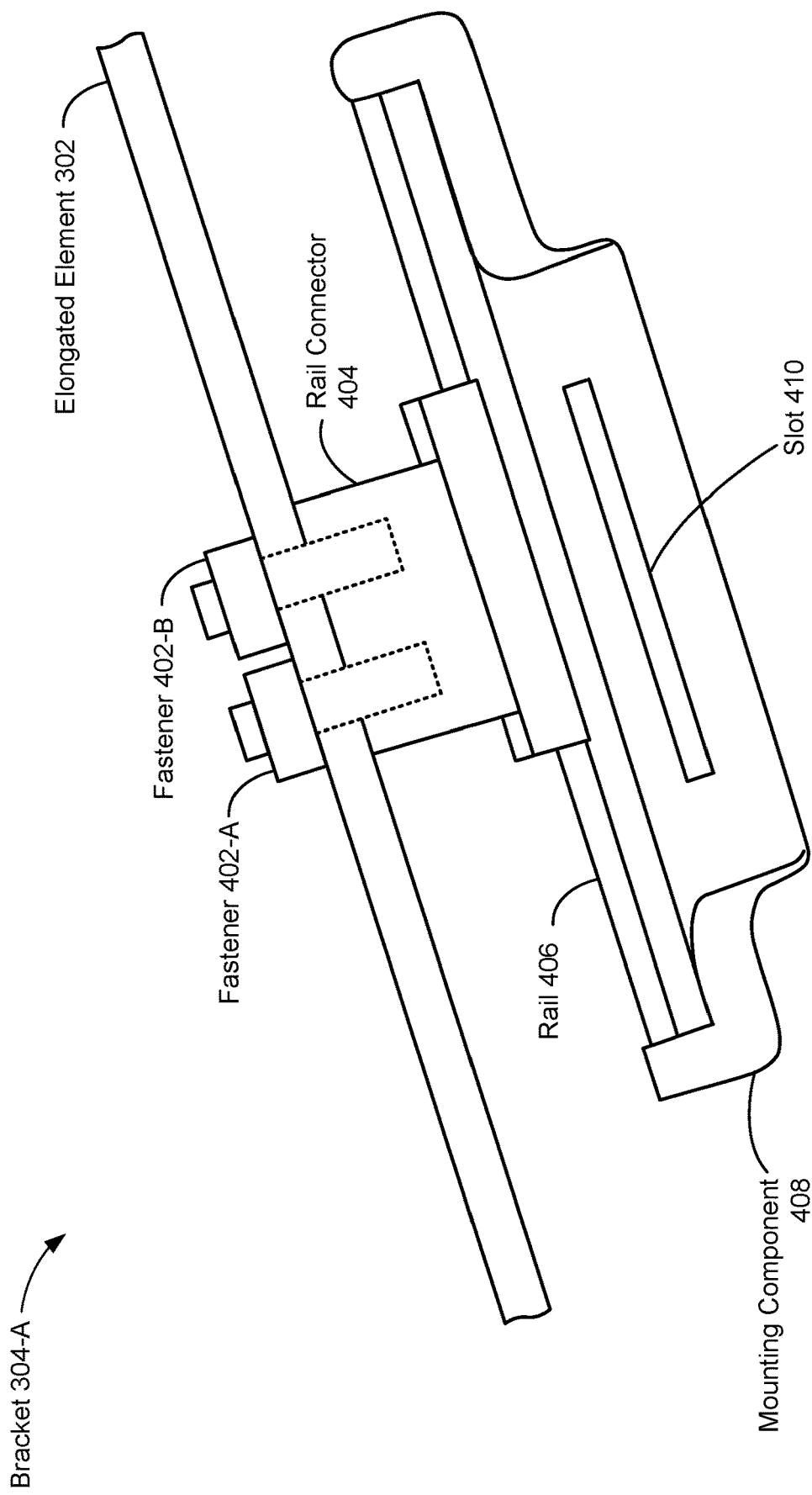
FIG. 4 shows an example bracket used to connect an elongated element to one of the user's fingers in accordance with some embodiments.

FIG. 4 is a close-up view of the first bracket 304-A and its rail assembly that is used to slideably attach the elongated element 302 with the user's finger. As shown, the first bracket 304-A includes a rail 406 and a rail connector 404 that facilitate the slideable attachment. Further, the first bracket 304-A includes fasteners 402-A and 402-B, and a mounting component 408. The rail connector 404 is slideably connected to (e.g., mounted on) the rail 406, which is in turn connected to the mounting component 408. The mounting component 408 is sized for a predetermined phalange of the user's finger (in this case, the proximal phalange 314), and the mounting component 406 includes at least one slot 410 to secure the first bracket 304-A to the user's finger (e.g., straps fed through the at least one slot 410 can be wrapped around the user's finger to secure the bracket 304-A thereto). The elongated element 302 is mechanically fastened to the rail connector 404 via the fasteners 402-A and 402-B (in some embodiments, the fasteners 402-A and 402-B are replaced by an adhesive). Although not shown, the second bracket 304-B includes a mounting component that is similar to the mounting component 408 for securing itself to the user's finger. In some instances, the rail 406 is referred to as a "linear rail" because the rail connector 404's movement is linear.

By using the rail assembly shown in FIG. 4 (i.e., the rail 406 and rail connector 404), a middle portion of the elongated element 302 is not fixed in a single location and instead is able to slide along the rail 406, by way of the rail connector 404, in response to movements of the user's finger. In doing so, the proximal interphalangeal joint is able to move with respect to the metacarpophalangeal joint, and vice versa (when the jamming assembly 122 is in the unjammed state). Additionally, the rail assembly ensures that normal forces are applied to the user's finger, as opposed to tangential forces, which would put unwanted stress on the finger joints. It is noted that the rail assembly shown in FIG. 4 is optional. In those embodiments without the rail assembly, however, the proximal interphalangeal joint is unable to move with respect to the metacarpophalangeal joint, thereby creating unwanted encumbrance that can be distracting and unrealistic to the user. Accordingly, those embodiments with the rail assembly result in a better user experience. It is also noted that the movement of the rail connector 404 substantially corresponds to movement of the slideable ratchet 206 (e.g., when the slideable ratchet 206 slides forward towards the finger along the rail 308, the rail connector 404 also slides forward along the rail 406 towards the finger tip).

FIG. 3C also illustrates the secondary jamming assembly 125 in a magnified view 350. The secondary jamming assembly 125 is configured to prevent movement of the user's finger in a different manner than the jamming assemblies 122.

FIG. 3D shows an exploded view of the secondary jamming assembly 125, along with other components of the haptic device 120 in accordance with some embodiments. The secondary jamming assembly 125 includes (i) a secondary jamming lever 354, (ii) a secondary actuator 355 to move the secondary jamming lever 354 from a first position to a second position different from the first position, and (iii) a rotatable ratchet 352 configured to rotate in response to movement of the user's finger. The secondary jamming assembly 125 also includes a thumb base 360, a bearing 358, a return spring 356, and a substrate 362. The thumb base 360 houses the bearing 358 on which the secondary jamming assembly 125 is pivoted. The thumb base 360 includes distinct mounting structures for the secondary actuator 355 (e.g., pneumatic bellow actuator), the secondary jamming lever 354 (e.g., a ratchet lever), and the lever return spring 356. The secondary jamming lever 354 is configured to engage with ratcheting teeth of the rotatable ratchet 352 and lock it in position once engaged. The actuator 355 can be pressured with a medium (e.g., air, gas, fluid) to engage the secondary jamming lever 354 and the return spring 356 brings the secondary jamming lever 354 to its non-engaged position when the medium pressure in the secondary actuator 355 is released. This engagement of the secondary jamming lever 354 prevents the sideways movement of the secondary jamming assembly 125, and therefore, the elongated element 302.

Because the elongated element 302 is coupled to the user's thumb (e.g., via the brackets 304-A and 304-B), it also locks the abduction-adduction (sideways) motion of the thumb at the metacarpophalangeal (first knuckle joint). The abduction-adduction motion at the carpometacarpal (thumb base joint) is not restricted by the secondary jamming assembly 125. Furthermore, the impeding force on the thumb due to locking is highly dependent on how well the glove substrate is grounded to the thumb. For example, rather than rigidly locking the thumb in place, the jamming assembly 125 can offer two different levels of mechanical impedance to the abduction-adduction motion of the thumb based on whether the rotatable ratchet 352 is engaged or not. This difference in mechanical impedance to thumb movement does provide haptic (kinesthetic force) feedback to the thumb and also creates an illusion of locking after certain angular displacement.

In some embodiments, a garment of the haptic device 120 worn by the user has a rigid substrate 362 that is used to mount the secondary jamming assembly 125 to the user's finger. Additionally, fasteners can be used to further secure the secondary jamming assembly 125 to the user's finger.

FIG. 5A shows a side view of a representative jamming assembly 122 in accordance with some embodiments. The jamming assembly housing 320 is transparent for ease of illustration and discussion. As shown, the representative jamming assembly 122 includes a support structure 322 that supports various components of the jamming assembly 122. The support structure 322 is coupled to a rigid substrate 324 (as shown in FIG. 3B) that is used to secure the jamming assembly 122 to the user's hand 310. The jamming assembly 122 also includes a rail 308 that is fixed to the support structure 322 and a rail connector 518. The slideable ratchet 206 is attached to the rail connector 518, which is in turn slideably attached to the rail 308. In this way, the slideable ratchet 206 is slideably attached to the support structure 322.

The slideable ratchet 206 includes (i) opposing first and second surfaces 512-A and 512-B and (ii) opposing first and second end portions 510-A and 510-B. As shown, a second end portion 514 of the elongated element 302 is attached to the slideable ratchet 206 at the slideable ratchet 206's second end portion 510-B. Furthermore, because the slideable ratchet 206 is slideably attached to the support structure 322 by way of the rail 308 and the rail connector 518, the elongated element 302 is also slideable. In this way, movement of the user's finger downward will cause the elongated element 302 to pull on the slideable ratchet 206, and the two components will slide (e.g., to the left in FIG. 5A) together. However, when the representative jamming assembly 122 is in the jammed state (e.g., the second end of the jamming lever 204 engages with the engagement portion 207 of the slideable ratchet 206), the slideable ratchet 206 is prevented from sliding, and as a consequence, the elongated element 302 and the user's finger are also prevented from moving. The rail 308 and the rail connector 518 are similar to the rail 406 and the rail connector 404, which are discussed in detail above with reference to FIG. 4.

As shown in FIG. 3B, the slideable ratchet 206 includes an engagement portion 207, which is defined along the first surface 512-A of the slideable ratchet 206. In some embodiments, the engagement portion 207 is defined along the entire length of the first surface 512-A, while in some other embodiments the engagement portion 207 is defined along only a portion of the slideable ratchet 206 (e.g., towards the slideable ratchet 206's first end portion 510-A).

FIGS. 5B-1 and 5B-2 show simplified views of the jamming assembly 122 in FIG. 5A transitioning from an unjammed state 500 to a jammed state 510 in accordance with some embodiments. As shown, in the unjammed state 500, a moveable component 203 of the actuator 202 is in a first position. In the first position, an end effector 330 of the moveable component 203 is not contacting the jamming lever 204. As a result, the jamming lever remains in an unengaged position.

In contrast, with reference to FIG. 5B-2, the jamming assembly 122 is in the jammed state 510. In the jammed state 510, the moveable component 203 of the actuator 202 is in a second position (e.g., moved rightwards). In the second position, the end effector 330 of the moveable component 203 is contacting the jamming lever 204. In fact, the end effector 330 applies a force to the jamming lever 204 that overcomes an opposing force applied to the jamming lever by the spring 326. Doing so rotates the jamming lever 204 about the axis 511 and the second end of the jamming lever 204 engages with the engagement portion 207 of the slideable ratchet 206, thus preventing movement of the slideable ratchet 206, the elongated element 302, and the user's finger in at least one direction. The jamming assembly 122, using a single actuator 202, prevents movement of the proximal interphalangeal joint and the metacarpophalangeal joint in at least one direction.

The jamming assembly designs disclosed herein are advantageous because the moveable components travel a short distance to transition the jamming assembly between the unjammed and jammed states. Because of this, a transition time between the unjammed and jammed states (or vice versa) is fast enough to correspond to media content displayed by the head-mounted display 110. For example, an example jamming assembly can transition from the unjammed state to the jammed state in under 100 ms. Also, depending on the displayed media content, the haptic device 120 may be required to transition one or more jamming assemblies between respective unjammed and jammed states many times during a single session. The jamming assembly designs disclosed herein are advantageous because only a couple components move when transitioning between states. Due to this efficient design, the jamming assemblies, and the haptic device 120 as a whole, are well-suited for the high cycle environment of virtual and/or augment reality.

FIG. 6 shows a side view of another representative jamming assembly 600 in accordance with some embodiments. The jamming assembly 600 is an example of the jamming assembly 122 discussed above. However, an actuator 602 of the jamming assembly 600 differs from the actuator 202 shown in FIG. 5A. Specifically, the actuator 602 is a pneumatic bellow actuator (i.e., a pressurized piston), whereas the actuator 202 is an electromagnetic actuator. Like the actuator 202, the actuator 602 includes a moveable component 604 that is configured to move between first and second positions. To move the moveable component 604 from the first position to the second position, the actuator 602 is pressured with a medium (e.g., air, gas, or fluid) (tubing to deliver the medium not shown). Further, an end effector 606 of the moveable component 604 is configured to contact a first end of the jamming lever 204 and rotate the jamming lever 204 about an axis when the actuator 602 is pressurized with the medium. Lastly, when the pressure inside the actuator 602 is released, a spring 608 returns the jamming lever 204 to its unengaged position, as shown in FIG. 6. The spring 608 is an example of the spring 310.

Figure 7A:
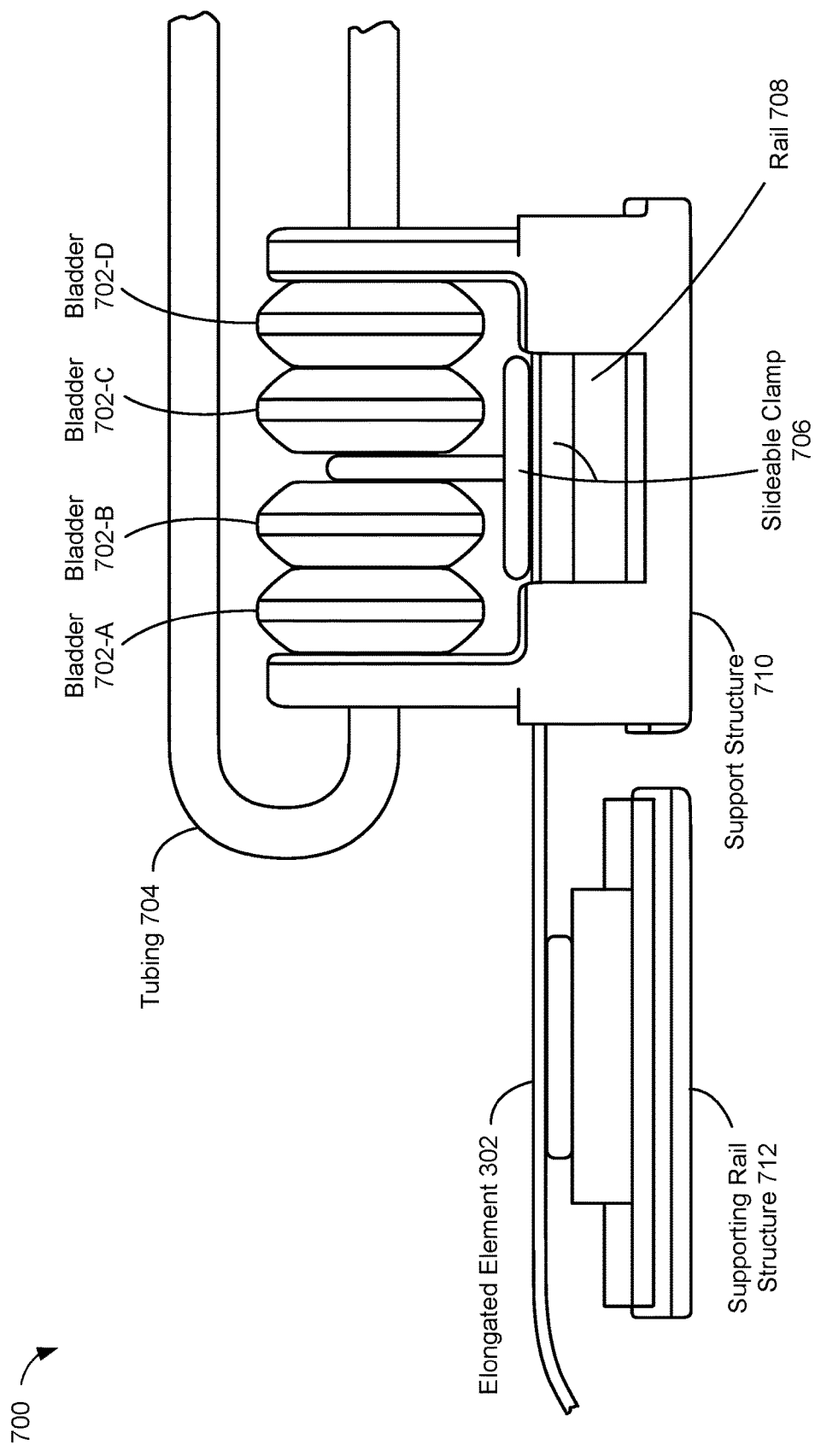
FIG. 7A shows a side view of a representative variable-stiffness actuator assembly in accordance with some embodiments.

FIG. 7A shows a side view of a representative variable-stiffness actuator assembly 700 in accordance with some embodiments. The variable-stiffness actuator assembly 700 differs structurally from the jamming assemblies discussed above, but it can nevertheless be used to achieve the same results, along with some additional functionality. The variable-stiffness actuator assembly 700 includes a plurality of inflatable bladders 702-A-702-D disposed around a slideable clamp 706 (also referred to as a "slideable component") (at a minimum, the variable-stiffness actuator assembly 700 includes two antagonistically arranged inflatable bladders). The inflatable bladders 702 (also referred to as "bellows") can be made out of stretchable silicone or inextensible Thermoplastic Polyurethane (TPU) fabric. The variable-stiffness actuator assembly 700 also includes tubing 704 that is configured to deliver a medium (e.g., air, gas, fluid, etc.) to each of the bladders 702. In some embodiments, the pressure inside each bladder 702 is controlled within a certain range using independent pressure regulators (not shown).

The slideable clamp 706 is slideably attached to a rail 708 housed within a support structure 710 of the variable-stiffness actuator assembly 700. Lastly, the slideable clamp 706 is attached to an elongated element 302, such that the slideable clamp 706 is configured to move back and forth in response to movements of the user's finger.

The variable-stiffness actuator assembly 700 also includes a supporting rail structure 712 that is similar to the first bracket 304-A discussed above with reference to FIG. 4. The main difference between the two structures is that the supporting rail structure 712 is mounted to the back of the user's hand, as opposed to being mounted to a phalange of the user's finger. Because of this, the supporting rail structure 712 includes a rigid substrate (e.g., similar to the substrate 324 in FIG. 3B) that is used to secure the variable-stiffness actuator assembly 700 to the user's hand 310. For example, the substrate of the supporting rail structure 712 may be attached to (or integrated with) a liner of a glove (or some other article of clothing) to be worn by the user. Although not shown, the support structure 710 may also be secured to the user's hand via an instance of the substrate 324.

In operation, the variable-stiffness actuator assembly 700 is configured to employ the stiffness of a pressurized fluid/medium to render a range of forces and impedances on the finger. In some embodiments, the variable-stiffness actuator assembly 700 is configured to transition between unjammed and jammed states, much like the jamming assemblies described above. To accomplish this, the plurality of inflatable bladders 702-A-702-D disposed around the slideable clamp 706 are either unpressurized (e.g., creating the unjammed state) or pressurized (e.g., creating the jammed state). To illustrate, when the inflatable bladders 702-A-702-D are unpressurized, the slideable clamp 706 is free to slide linearly back and forth in response to movements of the user's finger (e.g., the elongated element 302 pulls on the slideable clamp 706 when the user curls his or her finger). However, when the inflatable bladders 702-A-702-D are pressurized, the medium in the bladders 702-A-702-D prevents the slideable clamp 706 from moving back and forth. Further, because the slideable clamp 706 is unable to move, the elongated element 302 also cannot move, and in turn, the user's finger cannot move in at least one direction. Thus, the variable-stiffness actuator assembly 700 can prevent a wearer's finger from moving when the variable-stiffness actuator assembly 700 is in the jammed state.

Additionally, the variable-stiffness actuator assembly 700 is configured to apply directional forces to the wearer's finger (i.e., render a range of forces and impedances on the finger). Due to the antagonistic arrangement of the bladders 702, bidirectional forces and impedances can be generated using the variable-stiffness actuator assembly 700. As the differential pressure between the plurality of bladders 702 is changed, a range of forces can be generated on the slideable component 706 based on the magnitude of the pressure difference. Furthermore, by changing the pressure inside the plurality of bladders 702 simultaneously, the desired impedance can be rendered at the slideable component 706. In order to render a rigid object, the internal pressure in the bellows can be set to high while keeping the differential pressure between the bellows low. Doing so applies small forces on the finger phalanges while making it difficult for the user to deviate from the current position creating the perception that the user is interacting with a rigid object. Soft objects, on the other hand, can be realized by setting both the internal and differential pressure in the bellows to be low. This will apply small forces on the finger phalanges while allowing the user to deviate from the current position creating the perception that the user is interacting with a soft object. A range of experiences can be created by setting the differential and internal pressure of the plurality of bladders 702 using the variable-stiffness actuator assembly 700. This capability of the actuator 700 to bidirectionally render a range of forces and impedances simultaneously on the user's finger make this a versatile actuator.

The variable-stiffness actuator assembly 700 is able to create various haptic stimulations, including, but not limited to, a touch stimulation, a swipe stimulation, a pull stimulation, a push stimulation, a pulsating stimulation, an impedance stimulation, and/or a vibration stimulation (e.g., vibrations are created by quickly adding and removing the medium to and from opposing bladders 702). These various haptic stimulations are created by varying an amount of pressure in each of the bladders 702. For example, one or more bladders in the plurality of inflatable bladders 702-A-702-D can be pressurized to a first non-zero pressure while one or more other bladders in the plurality of inflatable bladders 702-A-702-D can be pressurized to a second non-zero pressure greater than the first non-zero pressure. Thus, in this example, all the bladders 702 are pressurized to some extent, which creates unique haptic stimulations. The exact pressures are chosen based, at least in part, on media content displayed by the head-mounted display 110, and information collected by the sensors 114 and/or the haptic sensors 124. In another example, if the bladders 702-C and 702-D are pressurized and the bladders 702-A and 702-B remain unpressurized, the slideable clamp 706 is forced to slide to the left. Doing so causes the elongated element 302 to also move to the left, and as a result, the wearer's finger is forced to curl or bend downwards, thereby creating an active haptic stimulation.

In light of the above, a haptic device that employs the variable-stiffness actuator assembly 700 can not only render objects, but can also make the user perceive as if they are interacting with a rigid or soft object by rendering a range of impedances on the user's hand. In addition, the variable-stiffness actuator assembly 700 can also create a set of interactions where the user's hand perceives forces but does not necessarily interact with a well-defined object (e.g. interaction of hand with air or water, impact with an object, etc.).

While four bladders 702 are shown in FIG. 7A, various numbers of bladders 702 (or a single bladder 702) can be included in the variable-stiffness actuator assembly 700.

FIG. 7B shows a representative slideable clamp 706 in accordance with some embodiments. The representative slideable clamp 706 includes upper and lower portions 715, 717, and the elongated element 302 in clamped between the upper and lower portions 715, 717. The upper portion 715 is the portion of the slideable clamp 706 engaged by the inflatable bladders 702, as shown in FIG. 7A. Additionally, the lower portion 717 is slideably coupled to the rail 708, and is configured to slide along the rail 708 in response to movements of the user's finger (as discussed above with reference to the rail 406 and the rail 308).

FIG. 8 is a flow diagram illustrating a method 800 of generating haptic stimulations in accordance with some embodiments. The steps of the method 800 may be performed (802) by a haptic device 120. FIG. 8 corresponds to instructions stored in a computer memory or computer readable storage medium (e.g., memory of the haptic device 120).

The haptic device includes (802) a jamming assembly, anchored to a back of a user's hand, that includes: (i) a jamming lever; (ii) an actuator to move the jamming lever from a first position to a second position different from the first position; and (iii) a slideable ratchet configured to move back and forth in response to movement of a first of the user's fingers. The haptic device also includes (802) an elongated element including opposing first and second end portions, where: (i) the first end portion is anchored to a predefined portion of the user's first finger and (ii) the second end portion is attached to an end portion of the slideable ratchet. Various embodiments of jamming assemblies and elongated elements are discussed above with reference to FIGS. 3A through 7.

The method 800 receives (804) an instruction from a computer system 110 to transition an actuator of the jamming assembly from a first state to a second state. The actuator is configured to move a jamming lever of the jamming assembly from a disengaged position to an engaged position when transitioned to the second state. The actuator is shown in a "first state" in FIG. 5B-1 and a "second state" in FIG. 5B-2. In some embodiments, the instruction from the computer is generated based on media content displayed to the user via the head-mounted display 110 and/or information collected by the haptic device (e.g., via sensors included with the haptic device) and/or the head-mounted display (e.g., via sensors included with the head-mounted display).

The method 800 also includes activating (806) the actuator based on the instruction. In doing so, the actuator moves the jamming lever from its disengaged position to its engaged position. Furthermore, the jamming lever, when moved to the engaged position by the actuator, engages with a slideable ratchet of the jamming assembly and prevents movement of the slideable ratchet, the elongated element, and the user's first finger in at least one direction. By preventing movement of the user's first finger, the user experience a haptic stimulation. To further illustrate, when the jamming assembly 122 transitions from the first state shown in FIG. 5B-1 to the second state as shown in FIG. 5B-2, an end effector 330 of the actuator 202 presses against a first end of the jamming lever 204 and applies a force to the jamming lever 204. Doing so rotates the jamming lever 204 about the axis 511 and a second end (i.e., a free end) of the jamming lever 204 engages with an engagement portion 207 of the slideable ratchet 206. The actuator, jamming lever, and slideable ratchet are discussed in further detail above.

In some embodiments, a controller is configured to control operation of the actuator. For example, the controller sends one or more signals, generated based on the instruction from the computer system, that activate the actuator (e.g., activation of the actuator causes the actuator to transition from the first state to the second state, and vice versa).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A haptic device comprising:
a jamming assembly, anchored to a back of a user's hand, including: (i) a jamming lever, (ii) an actuator to move the jamming lever from a first position to a second position different from the first position, and (iii) a slidable member configured to move back and forth in response to movement of a first of the user's fingers;
an elongated element including opposing first and second end portions, wherein: (i) the first end portion is anchored to a predefined portion of the user's first finger, the predefined portion is an intermediate phalange or a distal phalange of the user's first finger, and (ii) the second end portion is attached to an end portion of the slidable member;
a first bracket sized for the predefined portion of the user's first finger, wherein the first bracket anchors the first end portion of the elongated element to the predefined portion of the user's first finger; and
a second bracket sized for a proximal phalange of the user's first finger,
wherein a middle portion, between the first and second end portions of the elongated element, is slidably attached to the proximal phalange of the user's first finger by the second bracket;
wherein the user's first finger includes a dorsal surface and a palmar surface opposite the dorsal surface; and the elongated element is adjacent to the dorsal surface of the user's first finger; and
wherein the jamming lever, when moved to the second position by the actuator, engages with an engagement portion of the slidable member to prevent movement of the slidable member, the elongated element, and the user's first finger in at least one direction.

2. The haptic device of claim 1, wherein:
the second bracket includes a rail that substantially parallels the dorsal surface of the user's first finger at the proximal phalange; and
the elongated element includes a connector attached to the rail, the connector being configured to slide along the rail in response to movement of the user's first finger, when the jamming lever is in the first position.

3. The haptic device of claim 1, wherein the jamming assembly is anchored to the back of the user's hand near a proximal base of a first of the user's knuckles.

4. The haptic device of claim 1, wherein the jamming assembly further includes an energy source to power the actuator.

5. The haptic device of claim 1, wherein:
the actuator is pneumatically coupled, via tubing, to a pneumatic device; and
the pneumatic device is configured to control operation of the actuator.

6. The haptic device of claim 1, wherein:
the jamming assembly further includes a spring contacting the jamming lever;
in a first state, the actuator is configured to apply a first force to the jamming lever that does not overcome an opposing force applied to the jamming lever by the spring; and
in a second state, the actuator is configured to apply a second force to the jamming lever that overcomes the opposing force applied to the jamming lever by the spring, thereby causing the jamming lever to move from the first position to the second position.

7. The haptic device of claim 1, further comprising a secondary jamming assembly that includes (i) a secondary jamming lever, (ii) a secondary actuator to move the secondary jamming lever from a first position to a second position different from the first position, (iii) a secondary elongated element, and (iv) a rotatable member; and
when moved to the second position by the secondary actuator, the secondary jamming lever engages with an engagement portion of the rotatable member to prevent movement of the rotatable member, the secondary elongated element, and the user's first finger in a second direction different from the at least one direction.

8. The haptic device of claim 1, wherein the actuator is configured to move the jamming lever from the first position to the second position in response to receiving instructions from a computing device.

9. The haptic device of claim 8, further comprising a controller in communication with the computing device,
wherein the controller is configured to receive the instructions from the computing device and control operation of the actuator based on the instructions.

10. The haptic device of claim 1, wherein the engagement portion of the slidable member includes a plurality of closely-spaced positive-locking teeth.

11. The haptic device of claim 10, wherein:
the slidable member includes opposing first and second surfaces and opposing first and second end portions;
the second end portion of the elongated element is slidably attached to the second surface of the slidable member at the first end portion of the slidable member;
the second end portion of the slidable member, along at least a portion of the second surface of the slidable member, includes the plurality of closely-spaced positive-locking teeth; and
an end portion of the jamming lever fits between two or more of the plurality of closely-spaced positive-locking teeth when the jamming lever engages with the engagement portion of the slidable member.

12. The haptic device of claim 1, wherein:
the jamming assembly is a first jamming assembly;
the haptic device further comprises a plurality of jamming assemblies, including the first jamming assembly; and
each of the plurality of jamming assemblies is associated with a respective one of the user's fingers.

13. The haptic device of claim 12, wherein:
the elongated element is a first elongated element;
the haptic device further comprises a plurality of elongated elements, including the first elongated element; and
each of the plurality of jamming assemblies is attached to a respective one of the plurality of elongated elements.

14. A virtual-reality system comprising:
a haptic device comprising:
a jamming assembly, anchored to a back of a user's hand, including: (i) a jamming lever, (ii) an actuator to move the jamming lever from a first position to a second position different from the first position, and (iii) a slidable member configured to move back and forth in response to movement of a first of the user's fingers;
an elongated element including opposing first and second end portions, wherein: (i) the first end portion is anchored to a predefined portion of the user's first finger, the predefined portion is an intermediate phalange or a distal phalange of the user's first finger, and (ii) the second end portion is attached to an end portion of the slidable member;
a first bracket sized for the predefined portion of the user's first finger, wherein the first bracket anchors the first end portion of the elongated element to the predefined portion of the user's first finger; and
a second bracket sized for a proximal phalange of the user's first finger,
wherein a middle portion, between the first and second end portions of the elongated element, is slidably attached to the proximal phalange of the user's first finger by the second bracket;
wherein the user's first finger includes a dorsal surface and a palmar surface opposite the dorsal surface; and the elongated element is adjacent to the dorsal surface of the user's first finger; and
wherein the jamming lever, when moved to the second position by the actuator, engages with an engagement portion of the slidable member to prevent movement of the slidable member, the elongated element, and the user's first finger in at least one direction.

15. A method comprising:
at a haptic device comprising
(i) a jamming assembly anchored to a back of a user's hand, including: (a) a jamming lever, (b) an actuator, and (c) a slidable member configured to move back and forth in response to movement of a first of the user's fingers;
(ii) an elongated element including opposing first and second end portions, wherein: (a) the first end portion is anchored to a predefined portion of the user's first finger, the predefined portion is an intermediate phalange or a distal phalange of the user's first finger, and (b) the second end portion is attached to an end portion of the slidable member; and (c) the user's first finger includes a dorsal surface and a palmar surface opposite the dorsal surface; and the elongated element is adjacent to the dorsal surface of the user's first finger
(iii) a first bracket sized for the predefined portion of the user's first finger, wherein the first bracket anchors the first end portion of the elongated element to the predefined portion of the user's first finger; and
(iv) a second bracket sized for a proximal phalange of the user's first finger, wherein a middle portion, between the first and second end portions of the elongated element, is slidably attached to the proximal phalange of the user's first finger by the second bracket:

receiving an instruction from a computer system to transition the actuator of the jamming assembly from a first state to a second state, wherein the actuator is configured to move the jamming lever of the jamming assembly from a disengaged position to an engaged position when transitioned to the second state; and in response to receiving the instruction:
   activating the actuator based on the instruction, wherein the jamming lever, when moved to the engaged position by the actuator, engages with the slidable member of the jamming assembly and prevents movement of the slidable member, the elongated element, and the user's first finger in at least one direction.

* * * * *